US011932101B2

United States Patent
Mihara et al.

(10) Patent No.: US 11,932,101 B2
(45) Date of Patent: Mar. 19, 2024

(54) VALVE DEVICE

(71) Applicant: PIOLAX, INC., Kanagawa (JP)

(72) Inventors: Kenta Mihara, Kanagawa (JP); Kazuki Yajima, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 0 days.

(21) Appl. No.: 17/785,227

(22) PCT Filed: Dec. 17, 2020

(86) PCT No.: PCT/JP2020/047251
§ 371 (c)(1),
(2) Date: Jun. 14, 2022

(87) PCT Pub. No.: WO2021/132035
PCT Pub. Date: Jul. 1, 2021

(65) Prior Publication Data
US 2023/0027839 A1   Jan. 26, 2023

(30) Foreign Application Priority Data

Dec. 24, 2019   (JP) .................................. 2019-232768

(51) Int. Cl.
*F16K 24/04*        (2006.01)
*B60K 15/035*       (2006.01)
(Continued)

(52) U.S. Cl.
CPC ............ *B60K 15/035* (2013.01); *F16K 17/12* (2013.01); *F16K 24/044* (2013.01);
(Continued)

(58) Field of Classification Search
CPC ........ B60K 15/035; B60K 2015/03289; B60K 15/03504; B60K 15/03519;
(Continued)

(56) References Cited

U.S. PATENT DOCUMENTS 4,000,828 A * 1/1977 Crute ................. B60K 15/0406
220/203.26
4,753,262 A * 6/1988 Bergsma ................. F16K 17/36
137/39
(Continued)

FOREIGN PATENT DOCUMENTS

| JP | 2010-105469 A | 5/2010 |
| JP | 2013-536926 A | 9/2013 |
| WO | WO 2016/031726 A1 | 3/2016 |

OTHER PUBLICATIONS

Mar. 9, 2021, International Search Report issued for related PCT application No. PCT/JP2020/047251.
(Continued)

*Primary Examiner* — Craig J Price
(74) *Attorney, Agent, or Firm* — Paratus Law Group, PLLC

(57) ABSTRACT

There is provided a valve device including: a housing; a float valve; and a pressure adjusting valve. A first valve seat is formed from a peripheral edge of a valve hole. An accommodation portion is provided in a protruding manner from a surface of a partition wall. An inner periphery of the accommodation portion is provided with a reduced diameter portion and an increased diameter portion. A height of an upper end of the reduced diameter portion is equal to or greater than a front surface of the pressure adjusting valve in a state where the pressure adjusting valve is in contact with the first valve seat. The pressure adjusting valve is configured to be beyond the upper end of the reduced diameter portion when the pressure adjusting valve is raised to a maximum due to an increase in pressure in a fuel tank.

6 Claims, 16 Drawing Sheets

(51) Int. Cl.
*F16K 17/12* (2006.01)
*B60K 15/03* (2006.01)
*G05D 16/12* (2006.01)

(52) U.S. Cl.
CPC .... *B60K 2015/03289* (2013.01); *G05D 16/12* (2013.01); *Y10T 137/0874* (2015.04)

(58) Field of Classification Search
CPC ........ B60K 15/03289; B60K 15/03296; F16K 24/044; F16K 31/18; F16K 31/20; F16K 31/22; F16K 24/04; F16K 24/06; F16K 27/07; F16K 33/00; F02M 37/00; F02M 5/00–16; F02M 37/017; F02M 37/0076; G05D 16/12; G05D 16/0402; Y10T 137/0874; Y10T 137/3099
USPC ..... 137/15.26, 38, 39, 43, 315.08, 409, 429, 137/430, 587, 588; 220/86.2, 745, 746; 141/59, 198, 202, 229; 123/516, 518, 123/198 D, 520
See application file for complete search history.

(56) References Cited

U.S. PATENT DOCUMENTS

| | | | | |
|---|---|---|---|---|
| 5,004,002 | A * | 4/1991 | Kobayashi | B60K 15/03519 137/39 |
| 5,028,244 | A * | 7/1991 | Szlaga | B60K 15/03519 141/303 |
| 5,156,178 | A * | 10/1992 | Harris | B60K 15/03519 220/746 |
| 5,582,198 | A * | 12/1996 | Nagino | B60K 15/03519 137/202 |
| 5,590,697 | A * | 1/1997 | Benjey | F16K 24/042 141/46 |
| 5,738,132 | A * | 4/1998 | Zakai | F16K 17/36 137/43 |
| 5,797,434 | A * | 8/1998 | Benjey | F16K 17/366 141/46 |
| 5,924,438 | A * | 7/1999 | Cimminelli | F16K 17/04 137/39 |
| 6,422,261 | B1 * | 7/2002 | DeCapua | B29C 66/1122 137/202 |
| 6,561,211 | B2 * | 5/2003 | Devall | F16K 15/148 137/202 |
| 6,701,950 | B2 * | 3/2004 | Brock | F02M 25/0836 137/202 |
| 6,742,536 | B2 * | 6/2004 | Mills | B60K 15/03519 137/15.17 |
| 6,758,235 | B2 * | 7/2004 | Frohwein | F16K 1/36 137/202 |
| 6,779,545 | B2 * | 8/2004 | Hattori | F16K 24/044 137/493.1 |
| 6,827,098 | B2 * | 12/2004 | Sugiyama | F16K 24/044 137/202 |
| 6,840,263 | B2 * | 1/2005 | Palvolgyi | F16K 17/36 137/202 |
| 6,966,330 | B2 * | 11/2005 | Frohwein | F16K 24/04 137/202 |
| 7,104,277 | B2 * | 9/2006 | Hernandez | F16K 17/194 137/493.1 |
| 7,146,729 | B2 * | 12/2006 | Spink | F16K 24/044 29/469 |
| 7,163,023 | B2 * | 1/2007 | Spink | F16K 24/044 137/430 |
| 7,201,155 | B2 * | 4/2007 | Mills | F02M 33/08 123/520 |
| 7,207,347 | B2 * | 4/2007 | Olshanetsky | F16K 24/042 137/39 |
| 7,219,683 | B2 * | 5/2007 | Furuya | F16K 17/196 137/198 |
| 7,249,595 | B2 * | 7/2007 | Mills | B60K 15/03504 123/518 |
| 7,273,042 | B2 * | 9/2007 | Kito | F16K 24/042 123/518 |
| 7,448,365 | B2 * | 11/2008 | Mills | B60K 15/03519 123/520 |
| 7,543,597 | B2 * | 6/2009 | Leonhardt | F16K 24/048 137/39 |
| 7,913,671 | B2 * | 3/2011 | Arnalsteen | F16K 17/194 137/202 |
| 8,109,285 | B2 * | 2/2012 | Ehrman | F16K 24/042 137/202 |
| 8,118,051 | B2 * | 2/2012 | Arnalsteen | F16K 24/00 137/202 |
| 8,166,995 | B2 * | 5/2012 | Arnalsteen | F16K 17/36 137/202 |
| 8,171,952 | B2 * | 5/2012 | Martin | F16K 24/044 137/198 |
| 8,267,113 | B2 * | 9/2012 | Arnalsteen | F16K 17/36 137/202 |
| 8,272,398 | B2 * | 9/2012 | Erdmann | B60K 15/03519 137/197 |
| 8,286,658 | B2 * | 10/2012 | Devall | B60K 15/03504 137/39 |
| 8,365,756 | B2 * | 2/2013 | Kobayashi | B60K 15/03519 137/202 |
| 8,365,757 | B2 * | 2/2013 | Kobayashi | F16K 24/044 137/202 |
| 8,371,326 | B2 * | 2/2013 | Mills | F16K 24/044 137/202 |
| 8,689,816 | B2 * | 4/2014 | Pifer | F16K 24/044 123/518 |
| 9,045,036 | B2 * | 6/2015 | Mihara | B60K 15/035 |
| 9,360,872 | B2 * | 6/2016 | Pifer | F16K 11/076 |
| 9,403,432 | B2 * | 8/2016 | Vulkan | B60K 15/03519 |
| 9,434,246 | B2 * | 9/2016 | Vulkan | F16K 24/042 |
| 9,492,765 | B2 * | 11/2016 | Mihara | F02M 37/20 |
| 9,981,546 | B2 * | 5/2018 | Mihara | B60K 15/035 |
| 10,041,601 | B2 * | 8/2018 | Wada | F16K 27/0209 |
| 10,161,538 | B2 * | 12/2018 | Wada | F02M 21/0242 |
| 10,369,882 | B2 * | 8/2019 | Mihara | F02M 37/0023 |
| 11,097,611 | B2 * | 8/2021 | Mukasa | F16K 24/046 |
| 11,733,718 | B2 * | 8/2023 | Mihara | F02M 25/0836 137/398 |
| 2006/0213553 | A1 * | 9/2006 | Mills | B60K 15/03519 137/43 |
| 2009/0071543 | A1 * | 3/2009 | Vulkan | F16K 24/042 137/15.26 |
| 2010/0218748 | A1 * | 9/2010 | Arnalsteen | B60K 15/03519 137/202 |
| 2013/0153051 | A1 | 6/2013 | Vulkan et al. | |
| 2013/0312841 | A1 * | 11/2013 | Vulkan | F16K 24/042 137/43 |
| 2017/0274760 | A1 | 9/2017 | Mihara | |
| 2023/0018794 | A1 * | 1/2023 | Yajima | F16K 24/042 |

OTHER PUBLICATIONS

Mar. 9, 2021, International Search Opinion issued for related PCT application No. PCT/JP2020/047251.

* cited by examiner

VALVE DEVICE

CROSS REFERENCE TO PRIOR APPLICATION

This application is a National Stage Patent Application of PCT International Patent Application No. PCT/JP2020/047251 (filed on Dec. 17, 2020) under 35 U.S.C. § 371, which claims priority to Japanese Patent Application No. 2019-232768 (filed on Dec. 24, 2019), which are all hereby incorporated by reference in their entirety.

TECHNICAL FIELD

The present invention relates to a valve device which is attached to a fuel tank of an automobile or the like and which can adjust pressure in the fuel tank.

BACKGROUND ART

For example, a fuel tank of an automobile is provided with a pressure adjusting valve that prevents rupture or the like of the fuel tank by causing fuel vapor to flow out to the outside when the pressure in the fuel tank increases to a predetermined value or more, and that prevents collapse or the like of the fuel tank by causing outside air to flow in from the outside of the fuel tank when the pressure in the fuel tank decreases to a predetermined value or less than the outside air pressure.

As a valve device provided with such a pressure adjusting valve as described above, for example. Patent Literature 1 below describes a valve having a housing provided with a lower float chamber on a lower side and an upper disk chamber on an upper side via a partition wall portion, a float disposed so as to be movable up and down in the lower float chamber, and a disk member (pressure adjusting valve) having a substantially disk shape disposed in the upper disk chamber. A fluid outlet port is formed in the partition wall portion, and the lower float chamber and the upper disk chamber communicate with each other. Further, an annular port is provided to protrude from a front peripheral edge of the fluid outlet port.

A tubular wall is provided to protrude from the upper disk chamber side of the partition wall portion. An inner periphery on a base end side of the tubular wall conforms to a circular shape of an outer periphery of the disk member, and an inner periphery on a front end side of the tubular wall is larger in diameter than the inner periphery on the base end side. When the disk member is lowered by its own weight, the disk member comes into contact with the annular port and closes the fluid outlet port. In this state, an upper surface of the disk member is disposed at a position that is beyond an upper end of the inner periphery on the base end side of the tubular wall and that reaches the inner periphery on the front end side of the tubular wall (see FIG. 5B of Patent Literature 1). When the pressure in the fuel tank increase, fluid such as fuel vapor flows into the upper disk chamber from the fluid outlet port, and pushes up the disk member.

CITATION LIST

Patent Literature

Patent Literature 1: JP-A-2013-536926

SUMMARY OF INVENTION

Technical Problem

In the valve device of Patent Literature 1, as described above, in a state where the disk member is in contact with the annular port to close the fluid outlet port, the upper surface of the disk member is disposed at the position that is beyond the upper end of the inner periphery on the base end side of the tubular wall and that reaches the inner periphery on the front end side. Therefore, when the internal pressure of the fuel tank increases, fluid flowed into the upper disk chamber from the fluid outlet port passes between an outer periphery of the disk member and the inner periphery on the base end side of the tubular wall, and is discharged to the inner periphery on the base end side of the tubular wall having an increased diameter, that is, the fluid pushing up the disk member escapes, which makes it difficult for the disk member to be pushed up and difficult to reliably raise the disk member to a maximum rising position (difficult to be fully stroked).

In order to make it easy to push up the disk member, it is conceivable to increase an outer diameter of the disk member to increase a pressure receiving area for receiving the fluid pressure on a lower surface side of the disk member. However, this may enlarge the disk member, and lead to an increase in the size of the entire device.

Therefore, an object of the present invention is to provide a valve device in which a pressure adjusting valve can be reliably fully stroked to a maximum rising position, and in which an increase in the size of the device can be suppressed by making the pressure adjusting valve compact.

Solution to Problem

In order to achieve the above object, a valve device according to the present invention includes: a housing in which a valve chamber is provided on a lower side and a ventilation chamber is provided on an upper side via a partition wall, the valve chamber communicating with an inside of a fuel tank, the ventilation chamber communicating with an outside of the fuel tank, and the partition wall being formed with a valve hole through which the valve chamber and the ventilation chamber communicate with each other; a float valve accommodated in the valve chamber so as to be movable up and down and configured to open and close the valve hole: and a pressure adjusting valve configured to adjust pressure and accommodated in the ventilation chamber so as to be movable up and down. A first valve seat which the pressure adjusting valve is to come into contact with and separate from is formed from a peripheral edge of the valve hole on a side of the ventilation chamber, and a second valve seat which the float valve is to come into contact with and separate from is formed from a peripheral edge of the valve hole on a side of the valve chamber. An accommodation portion that surrounds and accommodates the pressure adjusting valve is provided in a protruding manner from a surface of the partition wall on the side of the ventilation chamber, and an internal space of the accommodation portion communicates with the valve hole. An inner periphery of the accommodation portion is provided with a reduced diameter portion positioned on a side of the partition wall and having a shape adapted to an outer periphery of the pressure adjusting valve, and an increased diameter portion positioned above the reduced diameter portion and having a shape larger in diameter than the outer periphery of the pressure adjusting valve. A height of an upper end of the reduced diameter portion from the surface of the partition wall on the side of the ventilation chamber is equal to or greater than a front surface of the pressure adjusting valve in a state where the pressure adjusting valve is in contact with the first valve seat. The pressure adjusting valve is configured to be beyond the upper end of the reduced diameter portion when the pressure adjusting valve is raised to a maximum due to an increase in pressure in the fuel tank.

Advantageous Effects of Invention

According to the present invention, the inner periphery of the accommodation portion is provided with the reduced diameter portion having a shape adapted to the outer periphery of the pressure adjusting valve, the height of the upper end of the reduced diameter portion is equal to or greater than the front surface of the pressure adjusting valve in a state where the pressure adjusting valve is in contact with the first valve seat, and the pressure adjusting valve is configured to be beyond the upper end of the reduced diameter portion when the pressure adjusting valve is raised to the maximum due to the increase in the pressure in the fuel tank, so that when the internal pressure of the fuel tank increases, the fluid such as fuel vapor flowed into the internal space of the accommodation portion from the valve hole is prevented from flowing out from the internal space of the accommodation portion to the increased diameter portion until the pressure adjusting valve is raised to the maximum, and therefore, the pushing force by the fluid is easily applied to the back surface of the pressure adjusting valve, and the pressure adjusting valve can be reliably raised to the maximum rising position (can be fully stroked).

In addition, since the pressure adjusting valve can be fully stroked as described above, it is not necessary to increase the pressure receiving area on the back surface side of the pressure adjusting valve, and therefore, the pressure adjusting valve can be made compact, and an increase in the size of the valve device can be suppressed.

DESCRIPTION OF EMBODIMENTS

Hereinafter, an embodiment of a valve device according to the present invention will be described with reference to the drawings. In the following description, "fuel" means liquid fuel (including fuel droplets), and "fuel vapor" means evaporated fuel. In addition, the valve device in this embodiment is a valve device for a fuel tank to be attached to the fuel tank of a vehicle such as an automobile.

Figure 1:
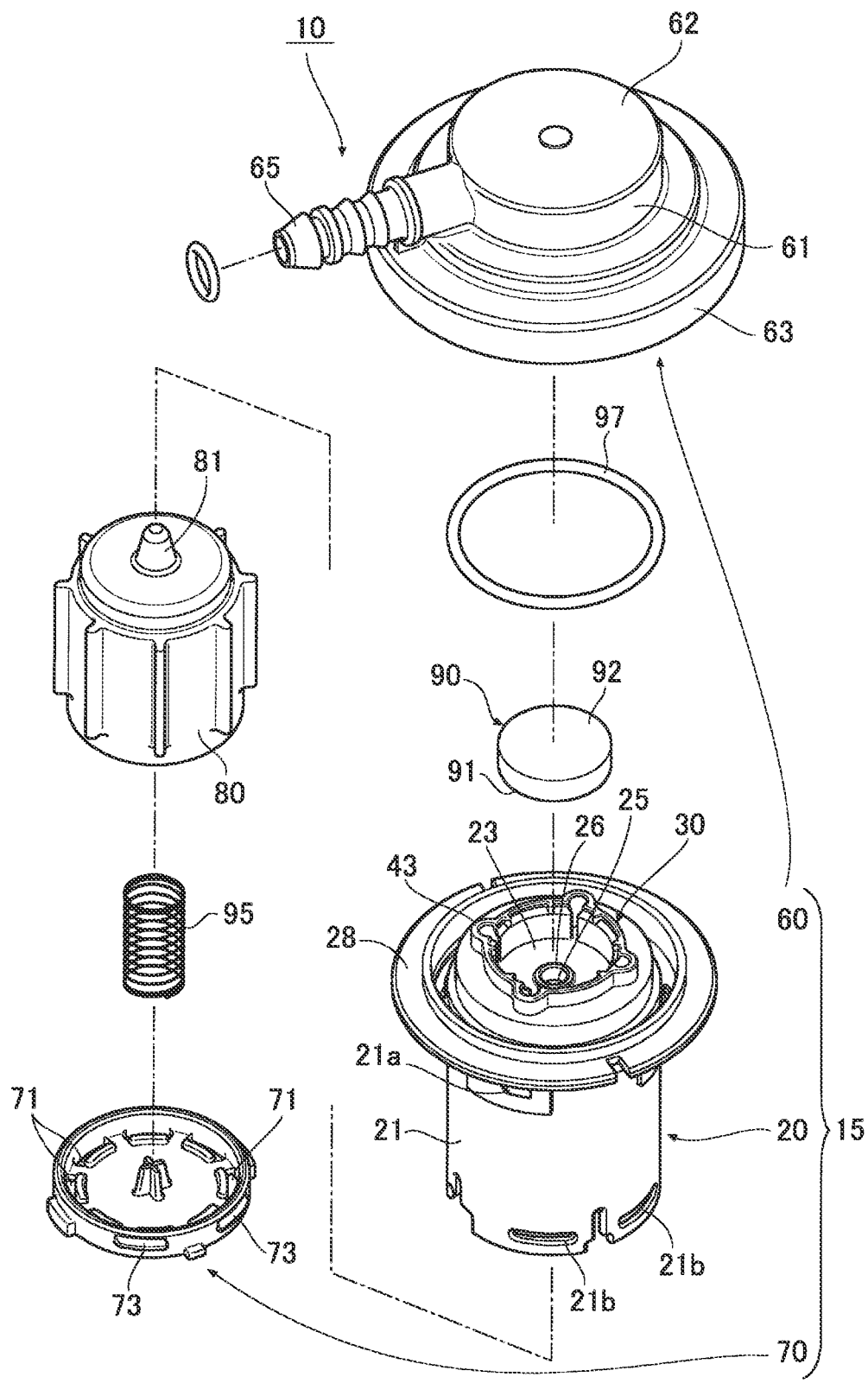
FIG. 1 is an exploded perspective view showing a valve device according to an embodiment of the present invention.

As shown in FIG. 1, a valve device 10 according to the present embodiment has a substantially tubular shape and includes a housing 15. The housing 15 includes a housing main body 20 provided with a partition wall 23 on an upper side, a cap 70 mounted on a lower side of the housing main body 20, and a cover 60 mounted on the upper side of the housing main body 20.

Figure 3:
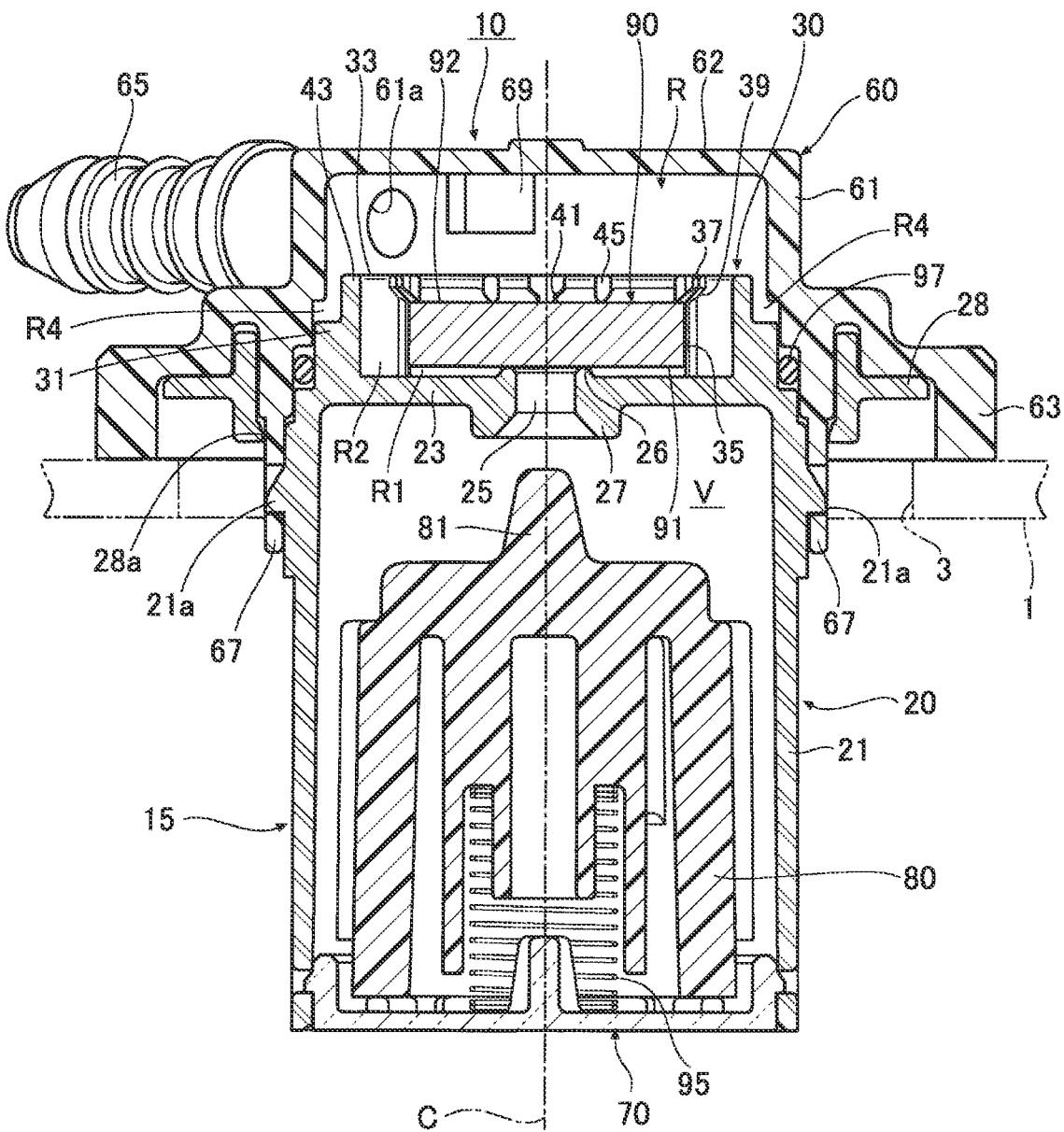
FIG. 3 is a cross-sectional view taken along a line A-A in FIG. 2.

As shown in FIGS. 1 and 3, the housing main body 20 has a peripheral wall 21 with a substantially cylindrical shape, and the partition wall 23 having a substantially disk shape is disposed on the upper side of the peripheral wall 21. The partition wall may be provided, for example, in the peripheral wall 21 of the housing main body 20 on the way in an axial direction, and the shape of the partition wall may be simply a disk shape, or may be a shape in which a central portion protrudes in a tubular shape and a wall portion (shoulder wall portion) provided at a peripheral edge portion has a stepped shape. The position and shape of the partition wall are not particularly limited.

Further, a flange portion 28 extending outward is formed from an upper outer peripheral edge of the peripheral wall 21. A plurality of insertion holes 28a are formed on an inner peripheral side of the flange portion 28 (see FIG. 5). Further, locking protrusions 21a are provided in a protruding manner at positions which are close to the upper side of the peripheral wall 21 and which are aligned with the insertion holes 28a (see FIG. 5). A plurality of locking holes 21b are formed on a lower side of the peripheral wall 21. Although not particularly shown, a plurality of through holes are formed in the peripheral wall 21.

Figure 2:
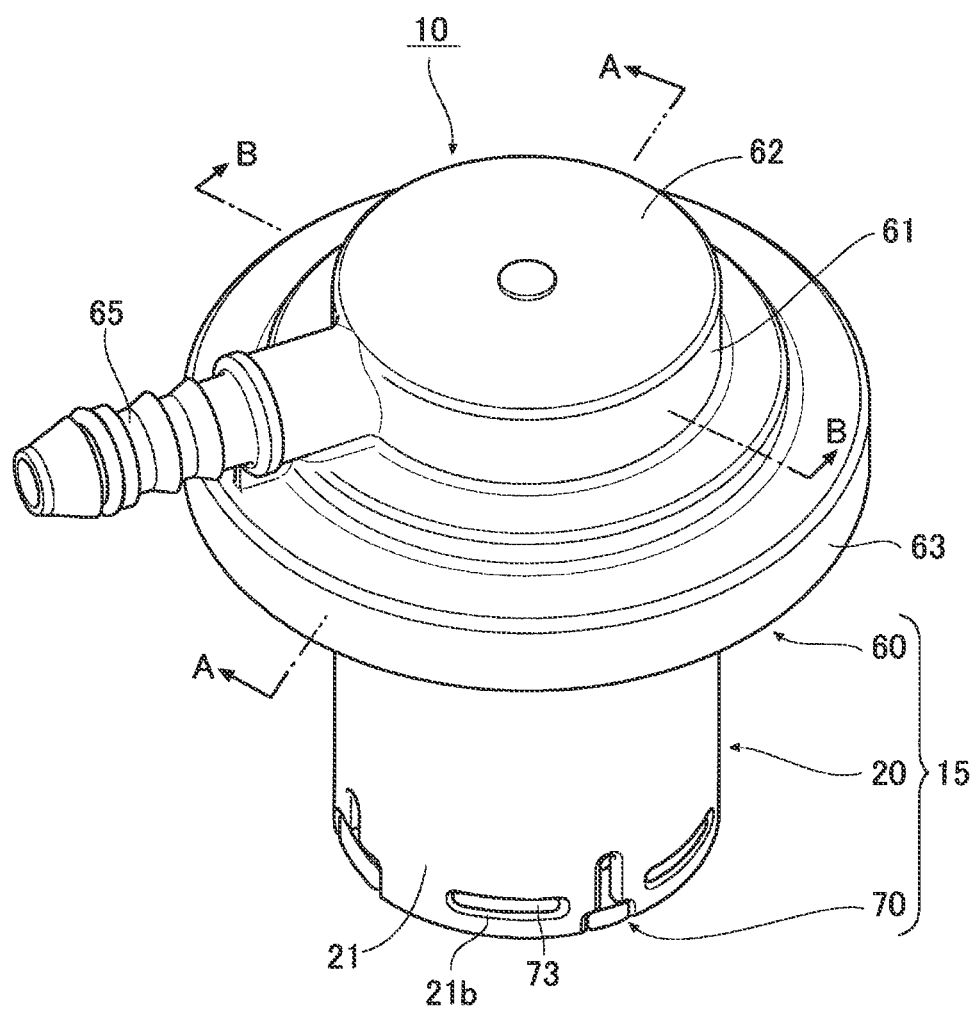
FIG. 2 is a perspective view of the valve device.

The cap 70 has a plurality of through holes 71, and a plurality of locking claws 73 are formed on an outer periphery of the cap 70. By locking each locking claw 73 of the cap 70 to each locking hole 21b of the housing main body 20, the cap 70 is mounted below the housing main body 20 (see FIG. 2). As a result, as shown in FIG. 3, a valve chamber V communicating with the inside of the fuel tank 1 is formed at the lower side of the housing via the partition wall 23. In the valve chamber V, a float valve 80 provided with a valve head 81 on the upper side is disposed so as to be movable up and down via an urging spring 95 (see FIG. 3).

The cover 60 has a substantially hat shape, and includes a substantially cylindrical peripheral wall 61, a ceiling wall 62 closing an upper portion of the peripheral wall 61, and a flange portion 63 annularly extending from a lower peripheral edge of the peripheral wall 61. A fuel vapor discharge port 61a (see FIG. 3) is formed at a predetermined position of the peripheral wall 61, and a fuel vapor pipe 65 having a substantially cylindrical shape extends outward from an outer peripheral edge portion of the fuel vapor discharge port 61a. A tube (not shown) that communicates with a canister (not shown) or the like disposed outside the fuel tank is connected to the fuel vapor pipe 65. Further, a plurality of locking pieces 67 extend from a lower end portion of the peripheral wall 61 (see FIG. 3). As shown in FIG. 3, the valve device 10 can be attached to the fuel tank 1 by fixing a lower end portion of the flange portion 63 to a front peripheral edge of an attachment hole 3 of the fuel tank 1 by welding or the like.

Figure 8:
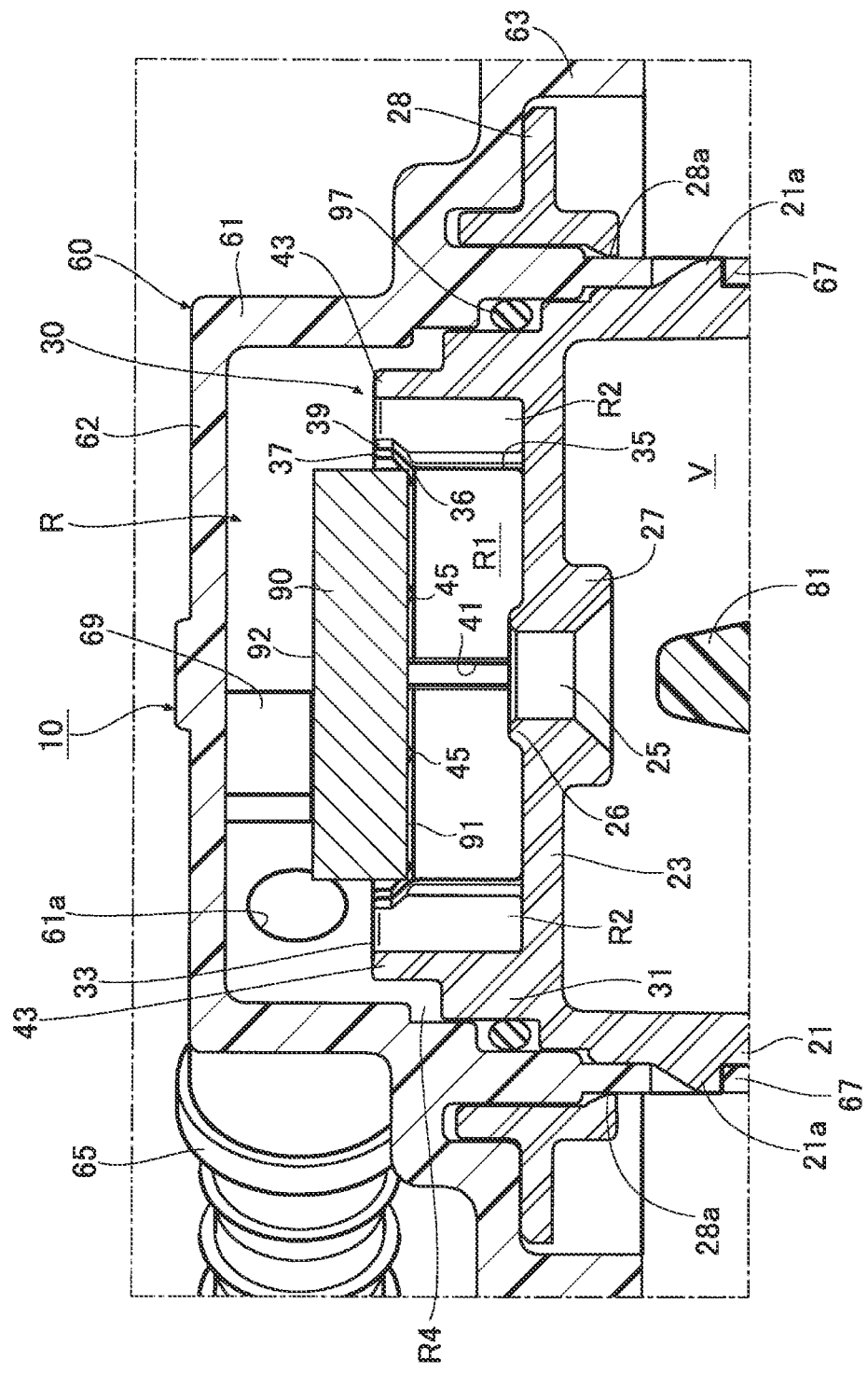
FIG. 8 is an enlarged cross-sectional view of a main part of the valve device in a state where the pressure adjusting valve is raised to the maximum and the valve hole is opened.

Further, as shown in FIG. 3, a position regulating portion 69 in the form of a protruding piece is vertically provided at a predetermined length from an inner surface of the ceiling wall 62. As shown in FIG. 8, a lower end of the position regulating portion 69 is contactable with a front surface 92 of a pressure adjusting valve 90, which will be described later, and regulates a further rise of the pressure adjusting valve 90. That is, the position regulating portion 69 defines a maximum rising position (full stroke position) of the pressure adjusting valve 90.

Then, in a state where a seal ring 97 is mounted on the upper outer periphery of the peripheral wall 21 of the housing main body 20, the cover 60 is covered from above to sandwich the seal ring 97, and each locking piece 67 of the cover 60 is inserted from the insertion hole 28a of the housing main body 20 and locked to each locking protrusion 21a correspondingly, so that the cover 60 is attached to the upper side of the housing main body 20. As a result, via the partition wall 23, a ventilation chamber R communicating with an outside of the fuel tank is formed above the partition wall 23 (see FIG. 3).

Figure 6:
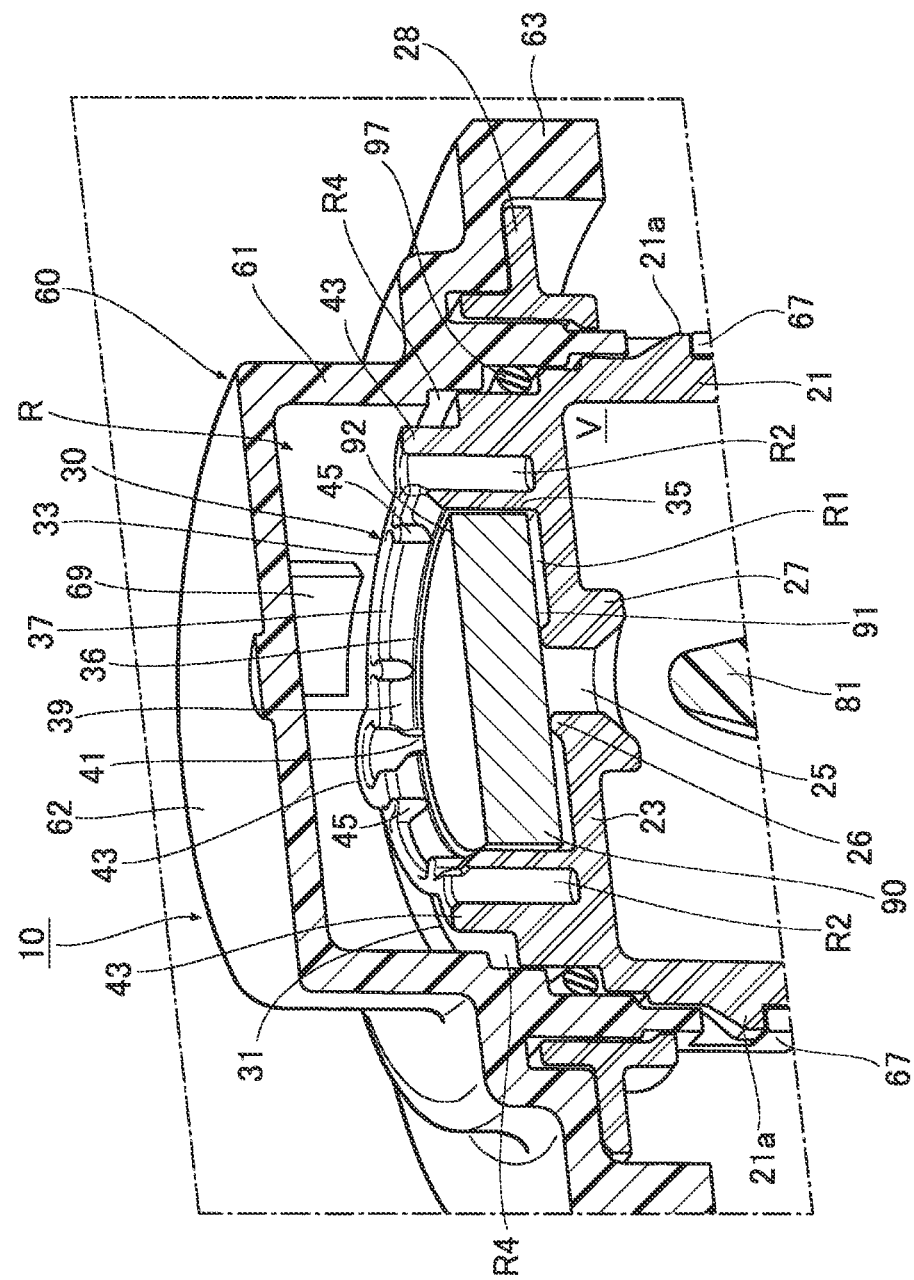
FIG. 6 is an enlarged cross-sectional perspective view taken along a line B-B in FIG. 2.
Figure 7:
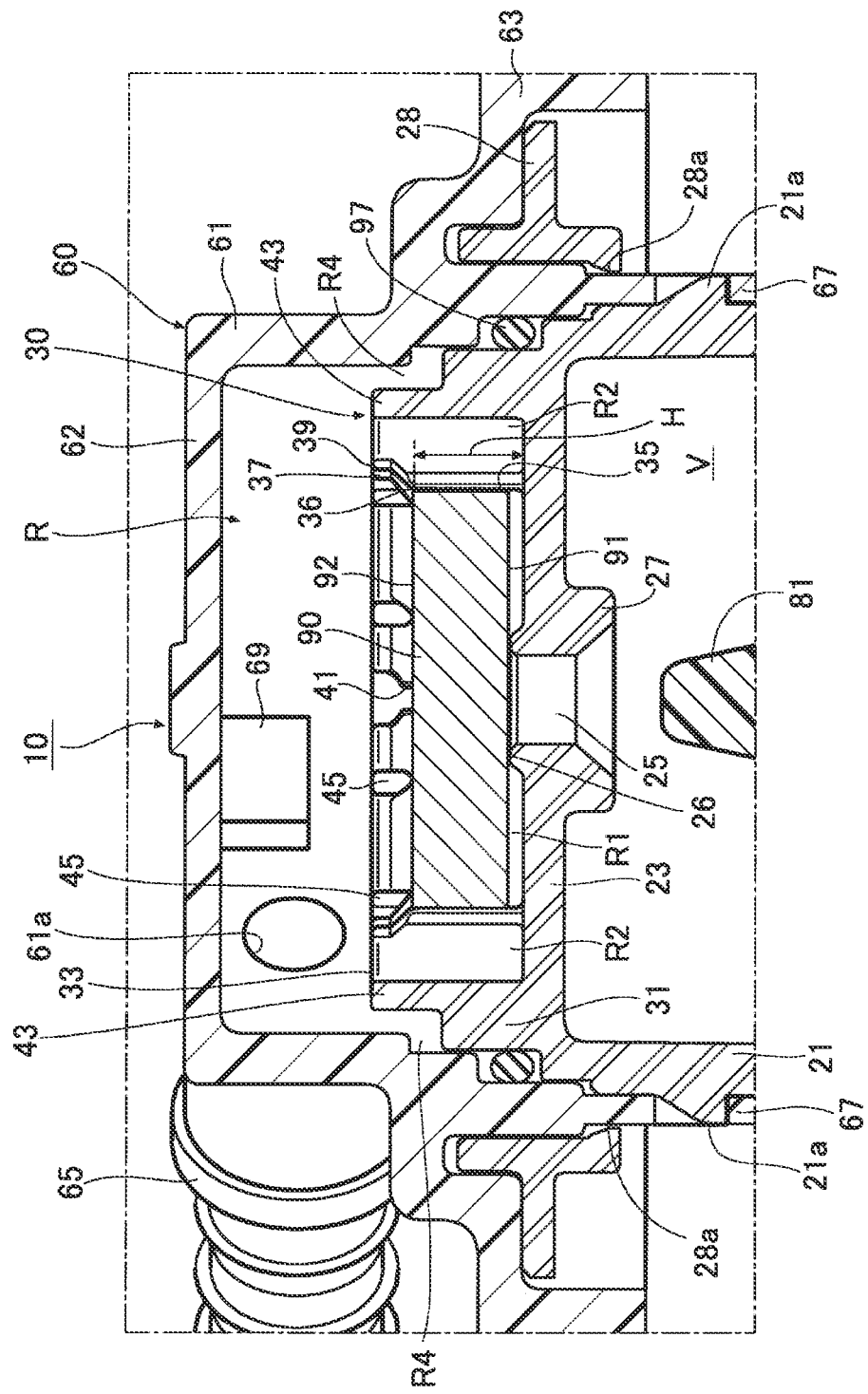
FIG. 7 is an enlarged cross-sectional view of a main part of the valve device in a state where a pressure adjusting valve is lowered and comes into contact with a first valve seat so as to close a valve hole.

The pressure adjusting valve 90 for adjusting the pressure of the fuel tank 1 is accommodated in the ventilation chamber R so as to be movable up and down (see FIGS. 7 and 8). As shown in FIGS. 1 and 6, the pressure adjusting valve 90 (hereinafter, also simply referred to as "adjusting valve 90") in this embodiment has a disk shape with a predetermined thickness. The adjusting valve 90 is not formed with a through hole or the like penetrating in a thickness direction thereof. The shape of the pressure adjusting valve is not particularly limited, and in addition to the disk shape, the pressure adjusting valve may have a rectangular, pentagonal, hexagonal, or polygonal plate shape, a substantially elliptical or substantially oval plate shape, or the like.

A material for the adjusting valve 90 is not particularly limited as long as it is a material that is not easily deformed or corroded by fuel vapor. For example, a metal material such as an iron-based metal including stainless steel (SUS304 or the like), a Ti-based alloy, a Cu-based alloy, and an Al-based alloy, a ceramic material, or a synthetic resin material can be used. The adjusting valve 90 of the present embodiment is made of stainless steel. As shown in FIG. 7, a surface of the adjusting valve 90 facing a first valve seat 26 is referred to as a back surface 91, and a surface opposite to the back surface 91 is referred to as the front surface 92.

The adjusting valve 90 is urged in a valve seat direction only by its own weight, and as shown in FIG. 7, the back surface 91 of the adjusting valve 90 is normally in contact with the first valve seat 26, which will be described later, to close a valve hole 25.

Returning to the description of the housing main body 20, as shown in FIG. 3, at the center of the partition wall 23, the valve hole 25 having a circular hole shape is formed so as to penetrate the partition wall 23. The valve chamber V and the ventilation chamber R communicate with each other through the valve hole 25. The first valve seat 26 is provided to protrude upward from a peripheral edge of the valve hole 25 on the ventilation chamber R side. As shown in FIGS. 7 and 8, the adjusting valve 90 is brought into contact with and separated from the first valve seat 26 to open and close the valve hole 25.

Figure 5:
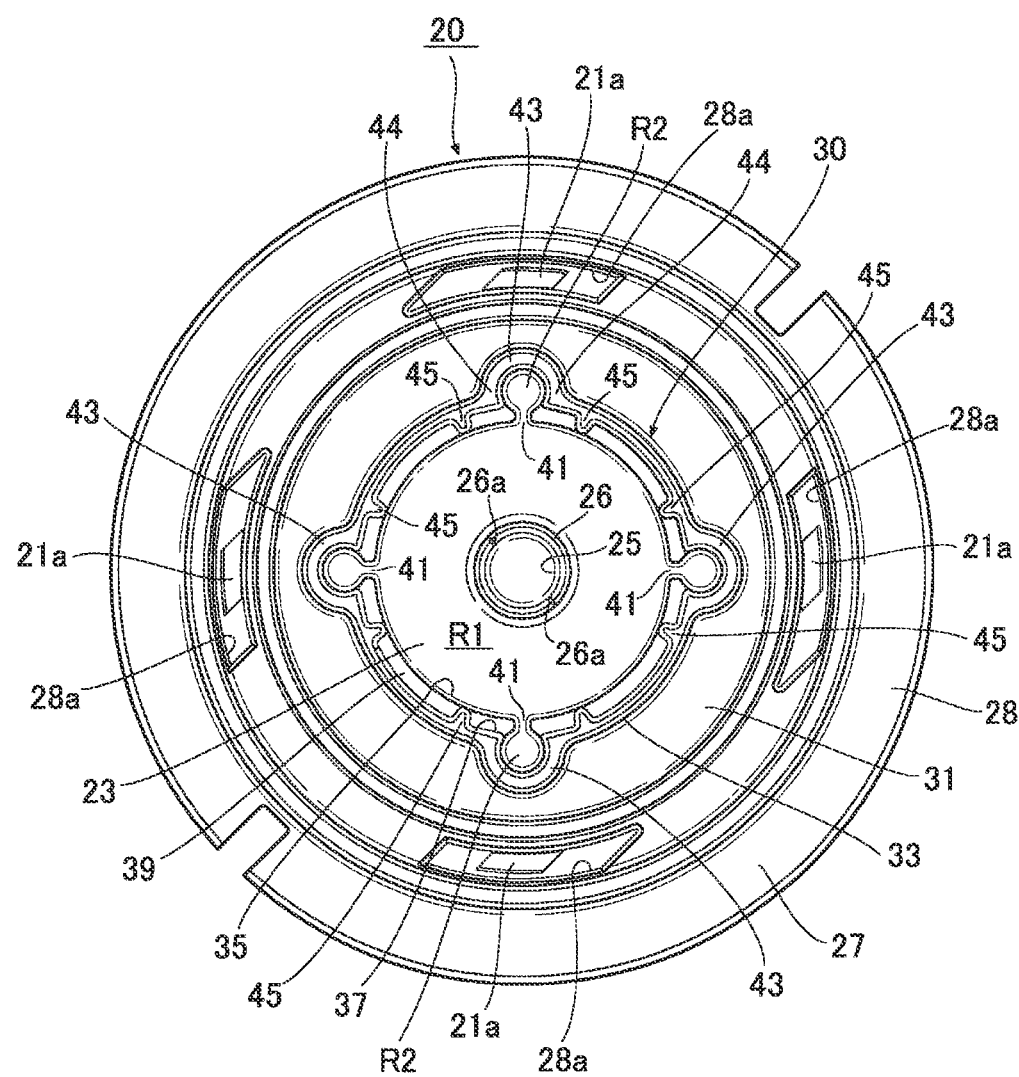
FIG. 5 is a plan view of the housing constituting the valve device.

As shown in FIG. 5, a pair of minute notches 26a. 26a are formed in the first valve seat 26 at positions facing each other in a radial direction. As shown in FIGS. 3 and 7, the pair of minute notches 26a, 26a prevents the valve hole 25 from being completely closed even when the back surface 91 of the adjusting valve 90 is in contact with the first valve seat 26.

Further, a second valve seat 27 is provided to protrude downward from a peripheral edge of the valve hole 25 on the valve chamber V side. The float valve 80 is brought into contact with and separated from the second valve seat 27 (in this case, the valve head 81 is brought into contact with and separated from the second valve seat 27) to close the valve hole 25.

An accommodation portion 30 that surrounds and accommodates the adjusting valve 90 is provided to protrude from an outer periphery of the first valve seat 26 on a surface (front surface) of the partition wall 23 on the ventilation chamber R side. As shown in FIGS. 3 to 6, the accommodation portion 30 according to this embodiment includes a base portion 31 having a substantially circular frame shape protruding by a predetermined height from the surface of the partition wall 23 on the ventilation chamber R side, and an extension wall 33 extending upward by a predetermined height from an inner peripheral edge of an upper end of the base portion 31.

Further, as shown in FIG. 5, when the accommodation portion 30 is viewed from the axial direction of the adjusting valve 90 (the direction along a direction in which the pressure adjusting valve moves up and down, and the direction matching the axial direction of the housing), as shown in FIG. 3, an accommodating space R1 for accommodating the adjusting valve 90 is formed on an inner side of the accommodation portion 30, and an outer space R2 is formed on an outer side of the accommodating space R1. In this embodiment, a tubular space formed inside a cover wall 43, which will be described later, forms the outer space R2. As shown in FIGS. 6 to 8, the accommodating space R1 is a space surrounded by the front surface of the partition wall 23, an inner peripheral surface of the accommodation portion 30, and the back surface 91 of the adjusting valve 90. The accommodating space R1 forms an "internal space" in the present invention.

Figure 4:
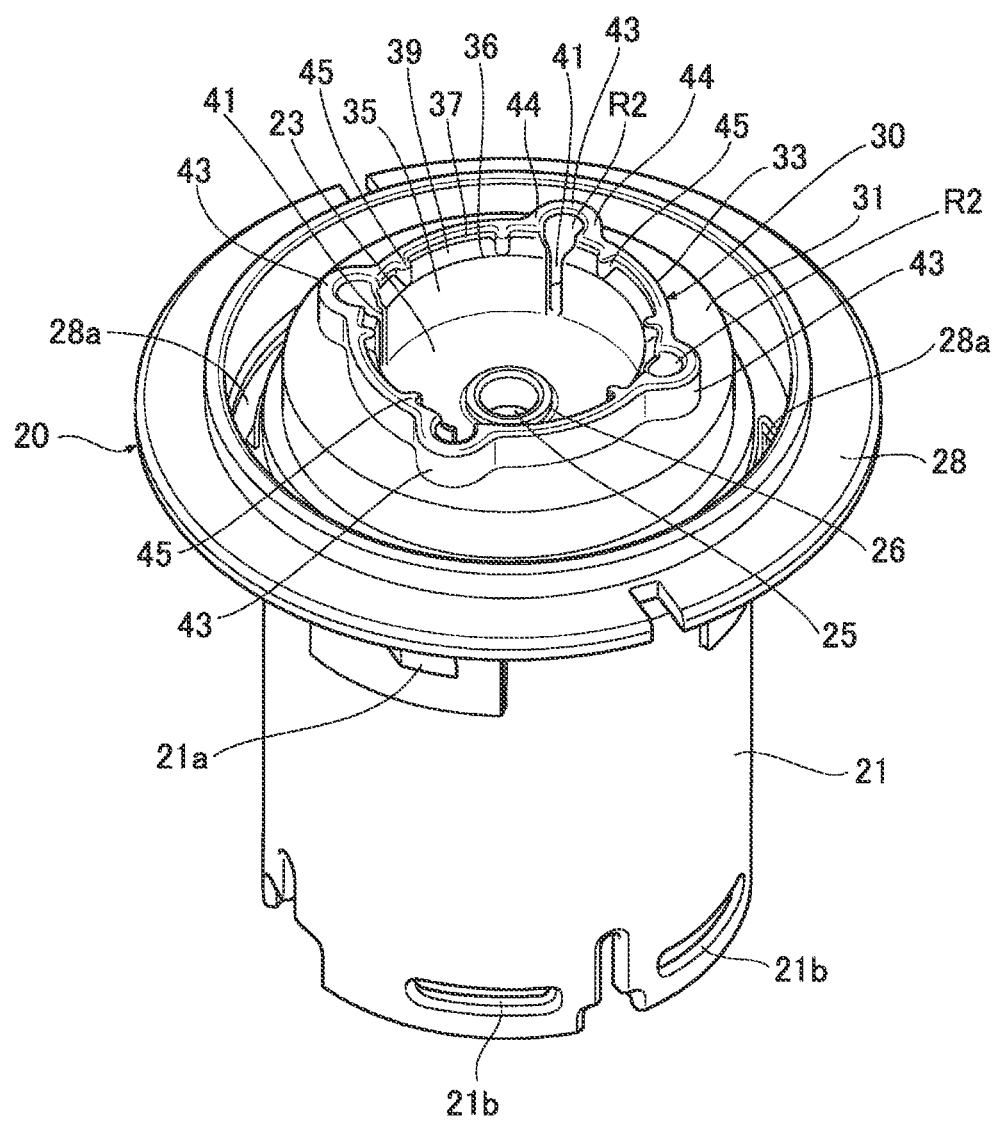
FIG. 4 is a perspective view of a housing constituting the valve device.

As shown in FIGS. 4 and 6, the inner periphery of the accommodation portion 30 is provided with a reduced diameter portion 35 positioned on the partition wall 23 side and having a shape adapted to the outer periphery of the adjusting valve 90, and an increased diameter portion 37 positioned above the reduced diameter portion 35 and having a shape larger in diameter than the outer periphery of the adjusting valve 90.

In this embodiment, the reduced diameter portion 35 has a circular inner peripheral surface corresponding to an outer peripheral shape (circular shape) of the adjusting valve 90 having a disk shape, and is formed to have a constant inner diameter along an axial direction C (see FIG. 3) of the housing 15 from the surface of the partition wall 23 on the ventilation chamber R side. A stepped portion 39 which is inclined such that the inner diameter of the accommodation portion gradually increases toward a direction away from the partition wall 23 is formed from an upper end 36 (see FIG. 4) of the reduced diameter portion 35 in the axial direction. The increased diameter portion 37 having a circular inner peripheral surface formed with a constant inner diameter is provided from an upper end of the stepped portion 39. That is, the increased diameter portion 37 is provided from the upper end 36 of the reduced diameter portion 35 via the stepped portion 39.

In this embodiment, as shown in FIG. 7, a height H of the upper end 36 of the reduced diameter portion 35 from the surface of the partition wall 23 on the ventilation chamber R side coincides with that of the front surface 92 of the adjusting valve 90 in a state where the adjusting valve 90 is in contact with the first valve seat 26 (that is, in a state where the back surface 91 of the adjusting valve 90 is in contact with the first valve seat 26). The height H of the upper end 36 of the reduced diameter portion 35 may be greater than or equal to that of the front surface 92 of the adjusting valve 90 in a state where the adjusting valve 90 is in contact with the first valve seat 26. Further, as shown in FIG. 8, the adjusting valve 90 is configured to be beyond the upper end 36 of the reduced diameter portion 35 when the adjusting valve 90 is raised to the maximum extent by the pressure rise in the fuel tank.

The accommodation portion 30 is formed with an opening 41 through which the accommodating space R1 and the outer spaces R2 communicate with each other. As shown in FIGS. 3 and 4, the opening 41 according to this embodiment has a slit shape extending in the axial direction C in a range from a lower end to an upper end of the accommodation portion 30. As shown in FIG. 5, in this embodiment, a plurality of openings 41 are formed at equal intervals in a peripheral direction of the accommodation portion 30 (four openings 41 are formed here).

By providing the opening 41 as described above, when the pressure in the fuel tank increases, the fluid flowed into the accommodating space R1 is easily released to the outer space R2, and the valve closing pressure of the adjusting valve 90 can be increased. Further, since the opening 41 is formed in a slit shape extending in the axial direction C, the fluid flowed into the accommodating space R1 is easily released to the outer space R2 without being affected by a stroke position of the adjusting valve 90 when the adjusting valve 90 is raised.

Further, as shown in FIG. 4, an opening width of the slit shaped opening 41 is constant from a lower end of the reduced diameter portion 35 (the portion to come into contact with the front surface of the partition wall 23) forming the accommodation portion 30 to the middle of the stepped portion 39, and gradually expands from the middle of the stepped portion 39 toward the upper end of the accommodation portion. As shown in FIG. 5, an inner portion of the opening 41 in the radial direction of the accommodation portion 30 communicates with the accommodating space R1, an outer portion of the opening 41 in the radial direction of the accommodation portion 30 communicates with a tubular space that forms the outer space R2, and an upper portion of the opening 41 communicates with the ventilation chamber R as shown in FIG. 6.

As shown in FIG. 5, the cover wall 43 is disposed outside the accommodating space R1 and at a position facing the opening 41. Both ends 44, 44 of the cover wall 43 are connected to the accommodation portion 30 on both sides of the opening 41.

More specifically, as shown in FIGS. 4 and 5, the cover wall 43 according to this embodiment protrudes by a predetermined height from a position facing the opening 41 on an upper end surface of the base portion 31 positioned at a lower portion of the extension wall 33 so that an axial cross section forms a substantially arc shape, and both ends 44, 44 of the cover wall 43 are connected to both sides of the opening 41 on the outer periphery of the extending wall 33.

A tubular space is formed inside the cover wall 43, and the tubular space forms the outer space R2. The tubular space of this embodiment is a substantially cylindrical space whose diameter is larger than a constant width portion of the slit shaped opening 41, such that a part of the inner periphery thereof communicates with the accommodating space R1 through the narrow opening 41, and an upper part thereof is open to communicate with the ventilation chamber R.

Further, as shown in FIG. 4, the increased diameter portion 37 is provided with a plurality of ribs 45 extending from the stepped portion 39 in the axial direction of the increased diameter portion 37 and arranged at predetermined intervals in a peripheral direction of the increased diameter portion 37, and inner ends of the ribs 45 in the radial direction are formed at the same positions as the inner peripheral surface of the reduced diameter portion 35 when the accommodation portion 30 is viewed in the axial direction (see FIG. 5).

As shown in FIGS. 4 and 5, the ribs 45 of this embodiment extend with a constant width from the stepped portion 39 to an upper end of the increased diameter portion 37, and the inner ends of the ribs in the radial direction are rounded in an arc shape, and are arranged at equal intervals in the peripheral direction of the increased diameter portion 37. Here, as shown in FIG. 5, a pair of ribs 45, 45 are arranged on both sides of each opening 41 in the peripheral direction, and a total of eight ribs 45 are provided. Further, the arc-shaped end surface of the inner ends of each rib 45 in the radial direction is flush with the inner peripheral surface of the reduced diameter portion 35 (see FIG. 4).

Further, as shown in FIGS. 3 and 7, a storage space R4 for storing the fuel flowed into the ventilation chamber R is formed between the outer periphery of the accommodation portion 30 and the inner periphery of the housing 15, and the upper end of the accommodation portion 30 is formed so as to be positioned below the fuel vapor discharge port 61a provided in the housing 15 and communicating with the outside of the fuel tank.

In this embodiment, the storage space R4 is defined by the upper surface of the base portion 31 forming the lower portion of the accommodation portion 30, the outer surface of the extension wall 33 including the cover wall 43, and the inner surface of the peripheral wall 61 of the cover 60 forming the housing 15, and the upper end of the extension wall 33 is positioned below the fuel vapor discharge port 61a.

The accommodation portion 30 of this embodiment has a substantially circular frame shape as a whole, but the accommodation portion may have, for example, a polygonal frame shape such as a quadrangular shape, a pentagonal shape, or a hexagonal shape, a substantially elliptical frame shape, a substantially oval frame shape, or the like. The accommodation portion preferably has a shape conforming to the outer peripheral shape of the pressure adjusting valve.

In addition, in the case of the present embodiment, the opening through which the accommodating space communicates the outer space is formed in a slit shape, but the opening may be a circular or prismatic through hole that communicates the inside in the radial direction and the outside in the radial direction of the accommodation portion, and may be any opening as long as the accommodating space and the outer space can communicate with each other.

In addition, the shape of the valve device according to the present invention other than the accommodation portion and the opening of the housing is not limited to that in the above embodiment.

Next, operation and effects of the valve device 10 having the above configurations according to the present invention will be described.

As shown in FIG. 3, in a state where a fuel liquid level in the fuel tank 1 does not rise and the float valve 80 is not immersed in the fuel, the float valve 80 moves down in the valve chamber V, the valve head 81 separates from the second valve seat 27, and a lower opening of the valve hole 25 is opened. When the pressure in the fuel tank 1 is equal to or lower than a predetermined value, the adjusting valve 90 is urged by its own weight in a direction toward the first valve seat 26, the back surface 91 is in contact with the first valve seat 26, and an upper opening of the valve hole 25 is closed. At this time, since the valve hole 25 is not completely closed due to the minute notches 26a (see FIG. 5) provided in the first valve seat 26 even when the back surface 91 of the adjusting valve 90 is in contact with the first valve seat 26, the valve chamber V and the ventilation chamber R communicate with each other via the valve hole 25 in the state shown in FIG. 3.

In the state shown in FIG. 3, when a vehicle turns in a curve, travels on a road, a slope, or the like having unevenness, or falls down due to an accident, the fuel in the fuel tank 1 oscillates violently and the fuel liquid level rises, the float valve 80 rises due to the urging force of the urging spring 95 and the buoyancy of the float valve 80 itself, the valve head 81 comes into contact with the inner peripheral edge portion of the second valve seat 27, and the lower opening of the valve hole 25 is closed, so that the fuel is prevented from flowing into the ventilation chamber R through the valve hole 25, and the fuel can be prevented from leaking to the outside of the fuel tank 1.

When the fuel vapor increases in the fuel tank 1 and the pressure in the fuel tank 1 increases due to traveling of the vehicle or the like, a fluid such as the fuel vapor passes through the through hole 71 of the cap 70, the valve chamber V, and the valve hole 25, and is likely to flow into the ventilation chamber R from the upper opening of the valve hole 25 (here, is likely to flow into the accommodating space R1 inside the accommodation portion 30). Then, since the fluid presses the back surface 91 of the pressure adjusting valve 90 that is in contact with the first valve seat 26, as shown in FIG. 8, the adjusting valve 90 is pushed up and is raised to the maximum (fully stroked) until the adjusting valve 90 comes into contact with the position regulating portion 69.

At this time, in the valve device 10, as shown in FIGS. 4 and 6, the reduced diameter portion 35 having a shape conforming to the outer periphery of the pressure adjusting valve is provided on the inner periphery of the accommodation portion 30; as shown in FIG. 7, the height of the upper end 36 of the reduced diameter portion 35 coincides with that of the front surface 92 of the adjusting valve 90 in a state where the adjusting valve 90 is in contact with the first valve seat 26; and as shown in FIG. 8, the adjusting valve 90 is configured to be beyond the upper end 36 of the reduced diameter portion 35 when the adjusting valve 90 is raised to the maximum extent by the pressure increase in the fuel tank.

Therefore, as described above, when the internal pressure of the fuel tank increases, the fluid flowed into the accommodating space R1 (internal space) inside the accommodation portion 30 from the valve hole 25 is suppressed from flowing out from the accommodating space R1 of the accommodation portion 30 to the increased diameter portion 37 side until the adjusting valve 90 is raised to the maximum, so that the pushing force by the fluid is easily applied to the back surface 91 of the adjusting valve 90, and the adjusting valve 90 can be reliably raised to the maximum rising position (can be fully stroked).

In addition, since the adjusting valve 90 can be fully stroked as described above, it is not necessary to increase a pressure receiving area (area receiving the pressure of the fluid) on the back surface 91 of the adjusting valve 90 (if the adjusting valve 90 is not fully stroked, it is necessary to increase the outer diameter of the adjusting valve 90 to secure the pressure receiving area), so that the adjusting valve 90 can be made compact, and an increase in the size of the valve device 10 can be suppressed.

On the other hand, when the pressure in the fuel tank 1 decreases, the adjusting valve 90 tends to move down in a direction approaching the first valve seat 26 by its own weight. At this time, since the accommodation portion 30 is formed with the opening 41 that allows the accommodating space R1 and the outer space R2 to communicate with each other, when the internal pressure of the fuel tank decreases, the fluid such as the fuel vapor is easily released from the housing space R1 to the outer space R2 through the opening 41. As a result, the valve closing pressure of the adjusting valve 90 (the pressure when the raised adjusting valve 90 moves down and comes into contact with the first valve seat 26 to close the valve hole 25 again) can be increased. Therefore, a difference between a valve opening pressure and the valve closing pressure can be reduced, and the adjusting valve 90 can be easily closed even when the pressure in the fuel tank 1 is high.

As described above, when the pressure in the fuel tank 1 increases, the adjusting valve 90 is pushed up by a fluid such as fuel vapor flowed into the accommodating space R1 from the valve hole 25.

At this time, in this embodiment, as shown in FIG. 4, the increased diameter portion 37 forming the accommodation portion 30 is provided with a plurality of ribs 45 extending from the stepped portion 39 in the axial direction of the increased diameter portion 37 and arranged at predetermined intervals in a peripheral direction of the increased diameter portion 37, and inner ends of the ribs 45 in the radial direction are formed at the same positions as the inner peripheral surface of the reduced diameter portion 35 when the accommodation portion 30 is viewed in the axial direction as shown in FIG. 5. Therefore, the plurality of ribs 45 configured as described above can guide the up and down operation of the adjusting valve 90, and the up and down operation of the adjusting valve 90 is stably performed.

As shown in FIGS. 4 and 5, both ends 44, 44 of the cover wall 43 are connected to the accommodation portion 30 on both sides of the opening 41, and the tubular space is formed inside the cover wall 43, the tubular space forming the outer space R2.

Therefore, when the pressure in the fuel tank 1 decreases, the fluid flowed into the accommodating space R1 from the valve hole 25 is easily released from the accommodating space R1 to the tubular space forming the outer space R2. In addition, since both ends 44, 44 of the cover wall 43 are connected to the accommodation portion 30 on both sides of the opening 41, deformation of the accommodation portion 30 toward the inner side in the radial direction can be suppressed at the time of molding the housing. Therefore, the accuracy of the width dimension of the opening 41 can be maintained, the accommodation portion 30 is suppressed from interfering with the adjusting valve 90, and the up and down operation of the adjusting valve 90 is not hindered. Further, both ends 44, 44 of the cover wall 43 are connected to both sides of the opening 41, and the opening 41 is surrounded by the cover wall 43, so that when the pressure in the fuel tank 1 increases, a fluid such as fuel vapor flowed into the accommodating space R1 from the valve hole 25 is unlikely to flow out from the accommodating space R1 to the outer space R2, the pushing force of the adjusting valve 90 by the fluid is easily maintained, and the adjusting valve 90 can be raised easily.

Further, in this embodiment, as shown in FIGS. 3 and 7, a storage space R4 for storing the fuel flowed into the ventilation chamber R is formed between the outer periphery of the accommodation portion 30 and the inner periphery of the housing 15, and the upper end of the accommodation portion 30 is formed so as to be positioned below the fuel vapor discharge port 61a provided in the housing 15 and communicating with the outside of the fuel tank. Therefore, the fuel flowed into the ventilation chamber R from the valve hole 25 can be temporarily stored in the storage space R4 at the time of fuel oscillation or the like, and the stored fuel can be suppressed from flowing into the fuel vapor discharge port 61a.

FIGS. 9 to 12 show another embodiment of the valve device according to the present invention. Substantially the same parts as those of the above embodiment are designated by the same reference numerals, and description thereof will be omitted.

Figure 9:
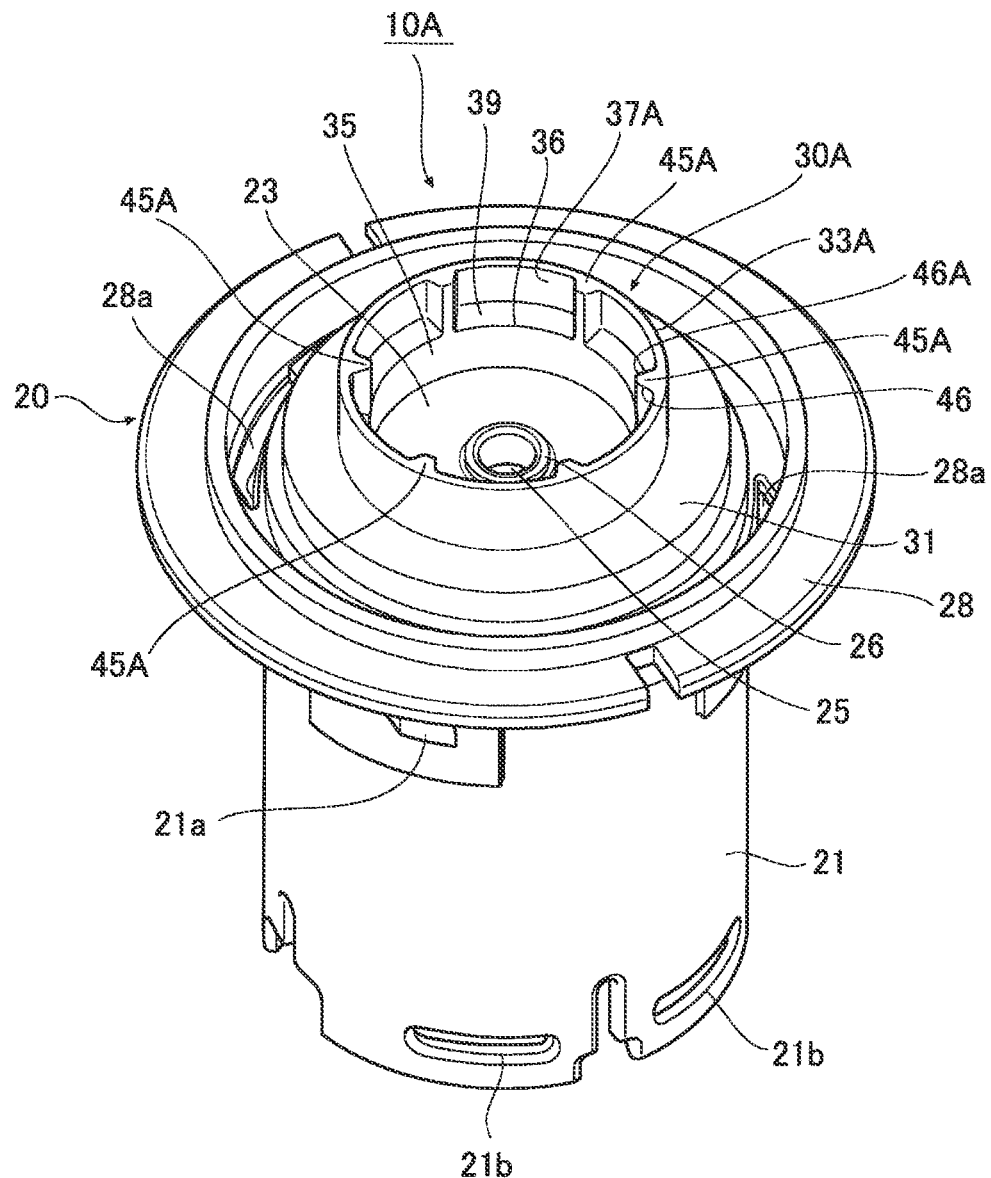
FIG. 9 shows a valve device according to another embodiment of the present invention, and is a perspective view of a housing constituting the valve device.
Figure 10:
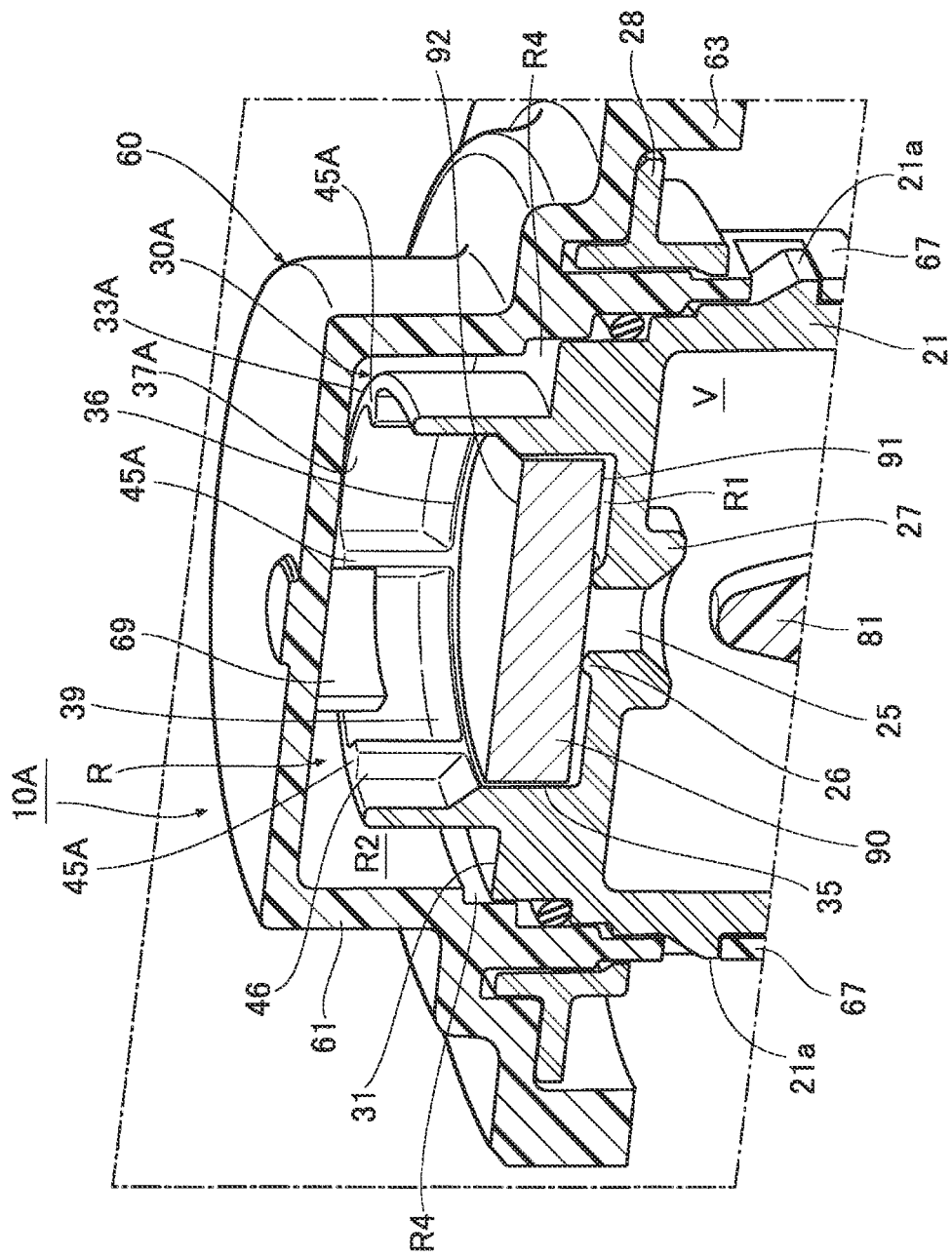
FIG. 10 is an enlarged cross-sectional perspective view of a main part of the valve device.

In a valve device 10 according to this embodiment, the structure of an accommodation portion 30A is different from that of the above-described embodiment. That is, as shown in FIGS. 9 and 10, the accommodation portion 30A in this embodiment includes a base portion 31 having a substantially circular frame shape and an extension wall 33A extending upward by a predetermined height from an inner peripheral edge of an upper end of the base portion 31. The extension wall 33A has a circular inner surface and a circular outer surface, and has a substantially cylindrical shape continuous in the peripheral direction. That is, the extension wall 33A is not provided with the opening 41 and the cover wall 43 as in the above-described embodiment. The extension wall 33A extends longer in the axial direction C of the housing 15 than the extension wall 33 in the above-described embodiment.

A reduced diameter portion 35 having a circular inner peripheral surface with a constant inner diameter corresponding to the outer peripheral shape of the adjusting valve 9) is formed on an inner periphery of the accommodation portion 30A at a position close to the partition wall 23 side. Further, an increased diameter portion 37A having a circular inner peripheral surface with a constant inner diameter is provided on the inner periphery of the accommodation portion 30A at a position separated from the partition wall 23 via an inclined stepped portion 39. The increased diameter portion 37A extends longer than the increased diameter portion 37 in the above-described embodiment.

Further, the increased diameter portion 37A is provided with a plurality of ribs 45A. Each rib 45A is a protrusion having a tapered surface shape in which both side surfaces 46, 46 are gradually inclined toward an inner side in the radial direction and having a substantially trapezoidal cross section, and extends with a constant width from the stepped portion 39 to an upper end of the increased diameter portion 37A. An inner end of each rib 45A in the radial direction has a flat surface shape, but is flush with the inner peripheral surface of the reduced diameter portion 35 (see FIG. 9).

Figure 11:
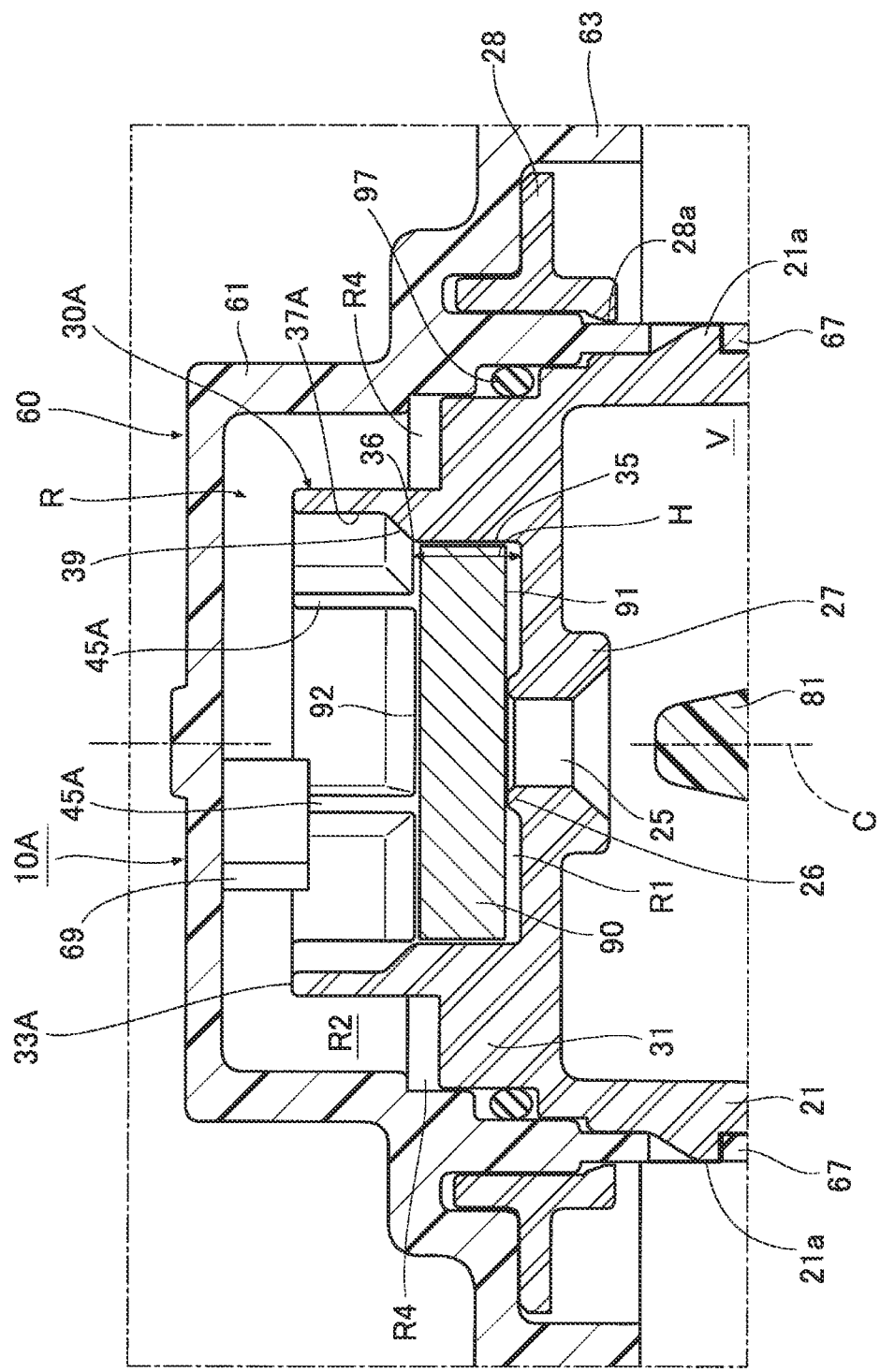
FIG. 11 is an enlarged cross-sectional view of a main part of the valve device in a state where the pressure adjusting valve is lowered and comes into contact with the first valve seat so as to close the valve hole.
Figure 12:
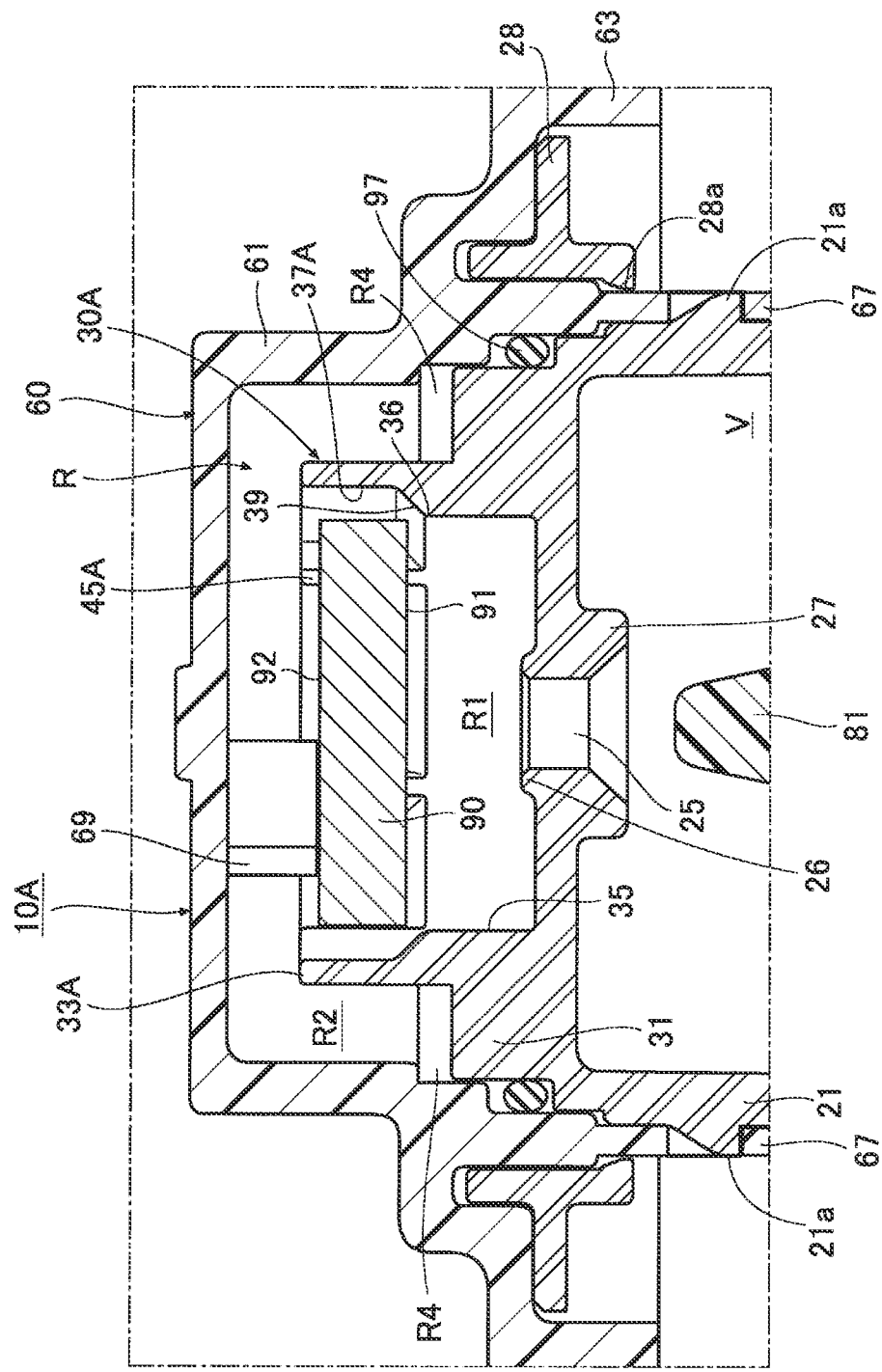
FIG. 12 is an enlarged cross-sectional view of a main part of the valve device in a state where the pressure adjusting valve is raised to the maximum and the valve hole is opened.
Figure 13:
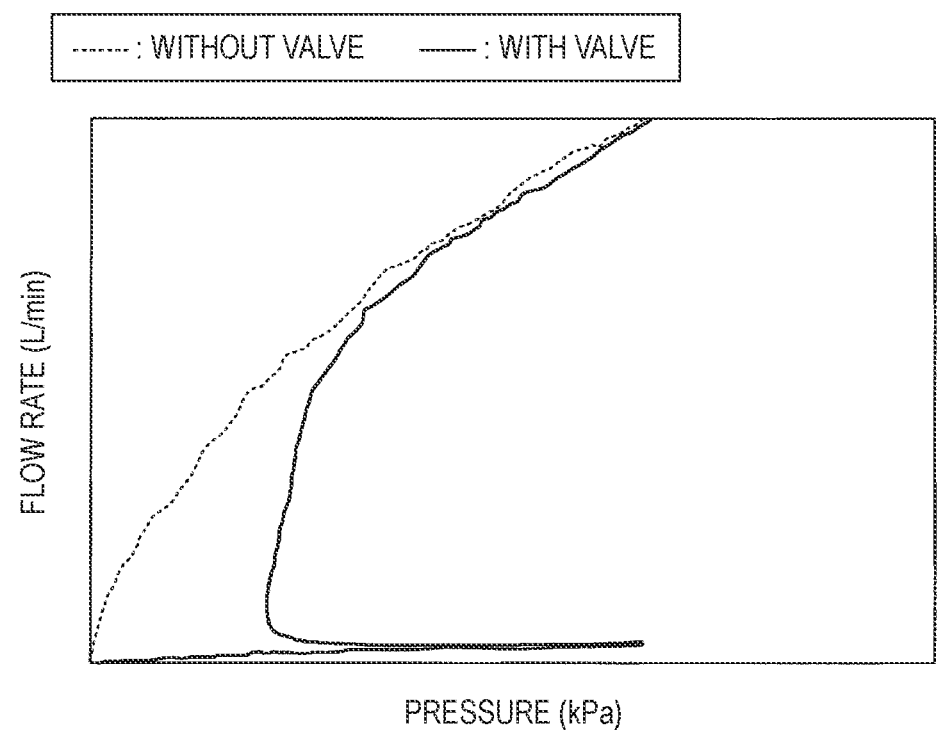
FIG. 13 is a graph showing a relationship between pressure and a flow rate in a test result of Example.

Further, as shown in FIG. 11, in this embodiment, the height H of the upper end 36 of the reduced diameter portion 35 from a surface of the partition wall 23 on the ventilation chamber R side is equal to or greater than that of the front surface 92 of the adjusting valve 90 in a state where the adjusting valve 90 is in contact with the first valve seat 26. Further, as shown in FIG. 12, the adjusting valve 90 is configured to be beyond the upper end 36 of the reduced diameter portion 35 when the adjusting valve 90 is raised to the maximum extent by the pressure increase in the fuel tank.

In the valve device 10A, by adopting the above configuration, when the internal pressure of the fuel tank increases, the fluid flowed into the accommodating space R1 (internal space) inside the accommodation portion 30A from the valve hole 25 is prevented from flowing out from the accommodating space R1 of the accommodation portion 30A to the increased diameter portion 37A side until the adjusting valve 90 is raised to the maximum, so that the pushing force by the fluid is easily applied to the back surface 91 of the adjusting valve 90, and the adjusting valve 90 can be reliably fully stroked to the maximum rising position.

The present invention is not limited to the embodiment described above, and various modifications can be made without departing from the gist of the present invention, and such embodiments are also included in the scope of the present invention.

EXAMPLE

Example

With respect to Example and Comparative Examples 1 to 3, the behavior of the pressure adjusting valve when the pressure in the fuel tank increased was tested.

Example

A valve device according to Example provided with a housing, an accommodation portion, and an opening similar to those of the valve device shown in FIGS. 1 to 8 was manufactured. In a state where the pressure adjusting valve is in contact with the first valve seat, the front surface of the pressure adjusting valve coincides with the position of the upper end of the reduced diameter portion. A flow path area (the area of a gap between an outer periphery of the pressure adjusting valve and an inner periphery of the increased diameter portion in the peripheral direction) is defined as "a".

Comparative Example 1

Figure 14A:
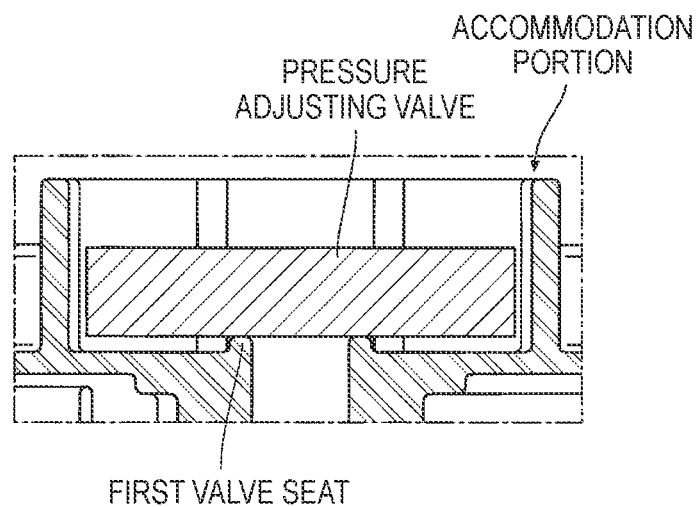
FIG. 14A is a diagram illustrating Comparative Example 1.

As shown in FIG. 14A, a valve device according to Comparative Example 1 was manufactured in the same manner as in Example except that the reduced diameter portion was not provided on an inner periphery of the accommodation portion. The inner periphery of the accommodation portion has a circular shape, and is formed to have a constant diameter from a lower end to an upper end. A flow path area (the area of a gap between the outer periphery of the pressure adjusting valve and the inner periphery of the accommodation portion in the peripheral direction) is defined as "b", and satisfies a<b.

Comparative Example 2

Figure 15A:
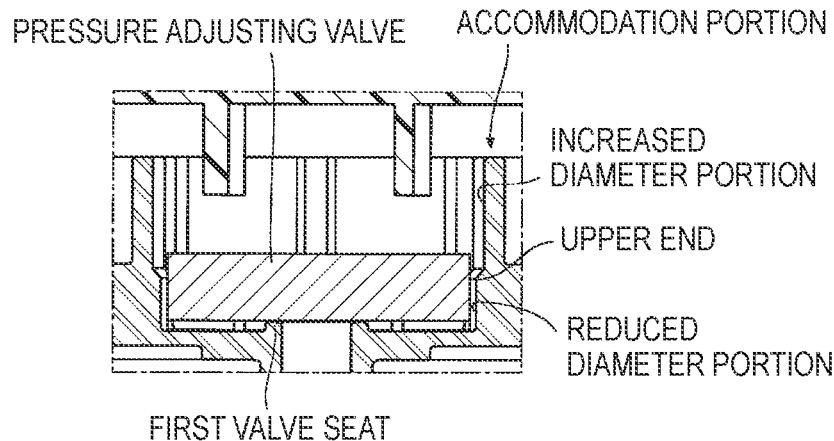
FIG. 15A is a diagram illustrating a state where a pressure adjusting valve is lowered in Comparative Example 2.
Figure 15B:
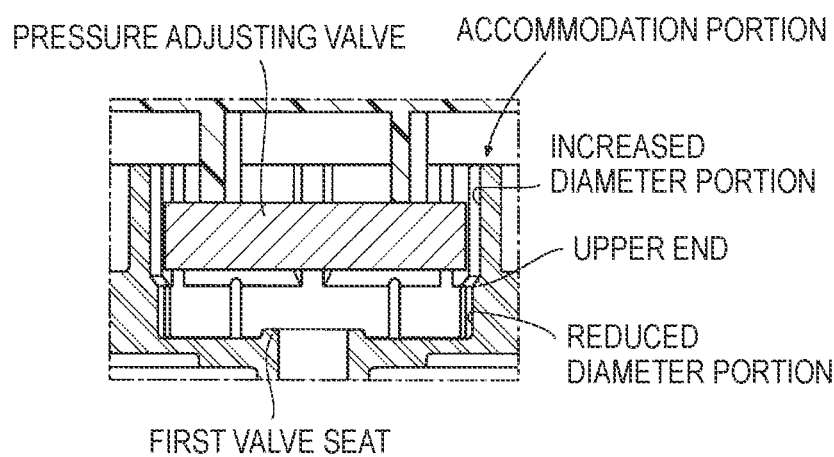
FIG. 15B is a diagram illustrating a state where the pressure adjusting valve is raised to the maximum in Comparative Example 2.

As shown in FIG. 15A, a valve device according to Comparative Example 2 was manufactured. The valve device is configured such that a reduced diameter portion and an increased diameter portion are formed on an inner periphery of an accommodation portion, but a front surface of a pressure adjusting valve is higher than an upper end of the reduced diameter portion in a state where the pressure adjusting valve is in contact with a first valve seat.

Comparative Example 3

Figure 16A:
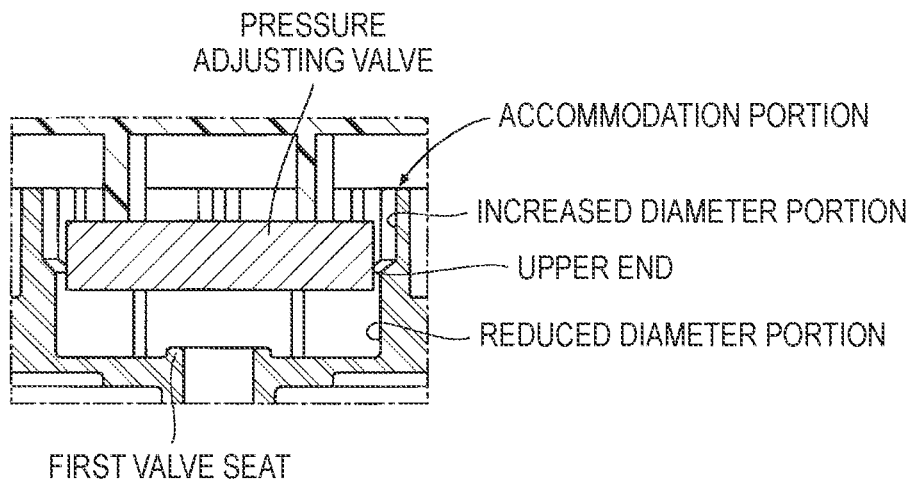
FIG. 16A is a diagram illustrating a state where a pressure adjusting valve is raised to the maximum in Comparative Example 3.

As shown in FIG. 16A, a valve device according to Comparative Example 3 was manufactured. The valve device is configured such that a reduced diameter portion and an increased diameter portion are formed on an inner periphery of an accommodation portion, and a front surface of a pressure adjusting valve is lower than an upper end of the reduced diameter portion in a state where the pressure adjusting valve is in contact with a first valve seat, but a lower surface of the pressure adjusting valve is positioned lower than the upper end of the reduced diameter portion when the pressure adjusting valve is raised to the maximum. A flow path area (the area of a gap between the outer periphery of the pressure adjusting valve and the inner periphery of the increased diameter portion in the peripheral direction) is defined as "c", and satisfies a<c.

Test Method

The valve devices according to Example and Comparative Examples 1 to 3 were set in a fuel tank, and air was blown from an air supply pipe (not shown) into the fuel tank at a predetermined flow rate until the pressure reached a certain pressure or more. At this time, the behavior of the pressure adjusting valve in the valve devices according to Example and Comparative Examples 1 to 3, that is, the fluctuation of the tank internal pressure when air was blown in and the pressure adjusting valve was raised was measured.

The results are shown in FIG. 13, FIG. 14B, FIG. 15C, and FIG. 16B, respectively. In each graph, a broken line (a line marked "without valve") indicates a relationship between the pressure and the flow rate when air is blown in a state where a pressure adjusting valve is not provided in the fuel tank (the line is common in each graph). A solid line (a line marked "with valve") indicates a relationship between the pressure and the flow rate when air is blown in a state where the pressure adjusting valve according to Example or Comparative Examples 1 to 3 is provided in the fuel tank.

Figure 14B:
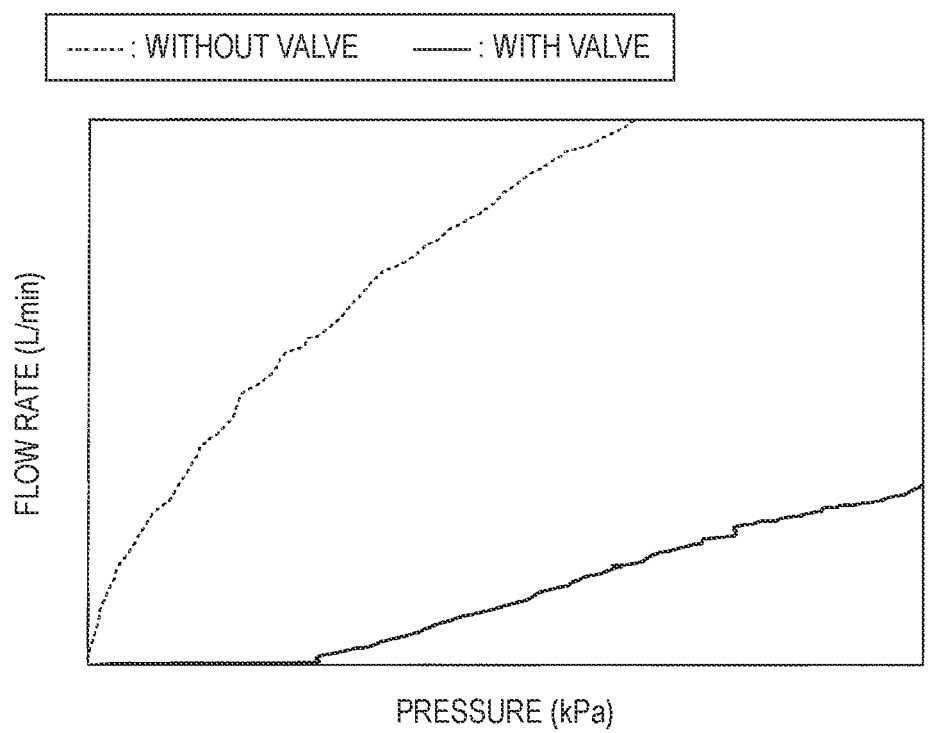
FIG. 14B is a graph showing a relationship between pressure and a flow rate in a test result of Comparative Example 1.

As shown in FIG. 14B, in Comparative Example 1, as the flow rate increased, the pressure only increased at a substantially constant rate, and the pressure adjusting valve was not raised to the maximum (not fully stroked). It is considered that this is because the flow path area is large and the fluid pushing up the pressure adjusting valve easily escapes.

Figure 15C:
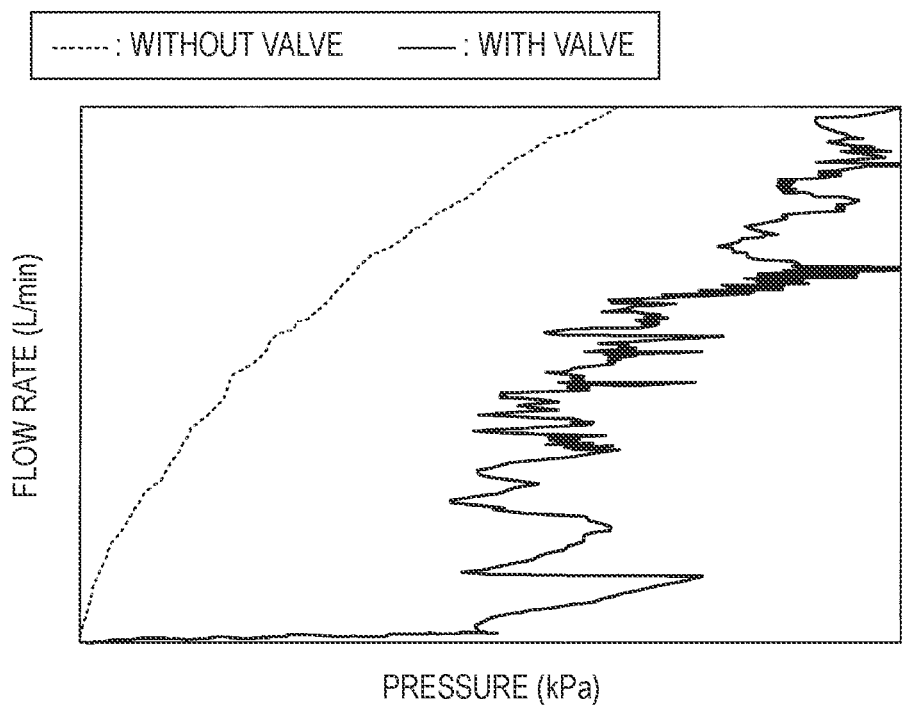
FIG. 15C is a graph showing the relationship between the pressure and the flow rate in a test result of Comparative Example 2.

As shown in FIG. 15C, in Comparative Example 2, as the flow rate increased, the pressure increased or decreased, and the pressure adjusting valve repeatedly moved in a vertical direction slightly, (when the pressure adjusting valve was raised, the valve hole was opened and the pressure decreased, and when the pressure adjusting valve was lowered, the valve hole was closed and the pressure increased). However, in this case, the pressure adjusting valve was not raised to the maximum either (not fully stroked). It is considered that, as the flow rate increased, the pressure adjusting valve was slightly raised, but the fluid immediately escaped to the increased diameter portion side, and the pressure adjusting valve was not fully stroked.

Figure 16B:
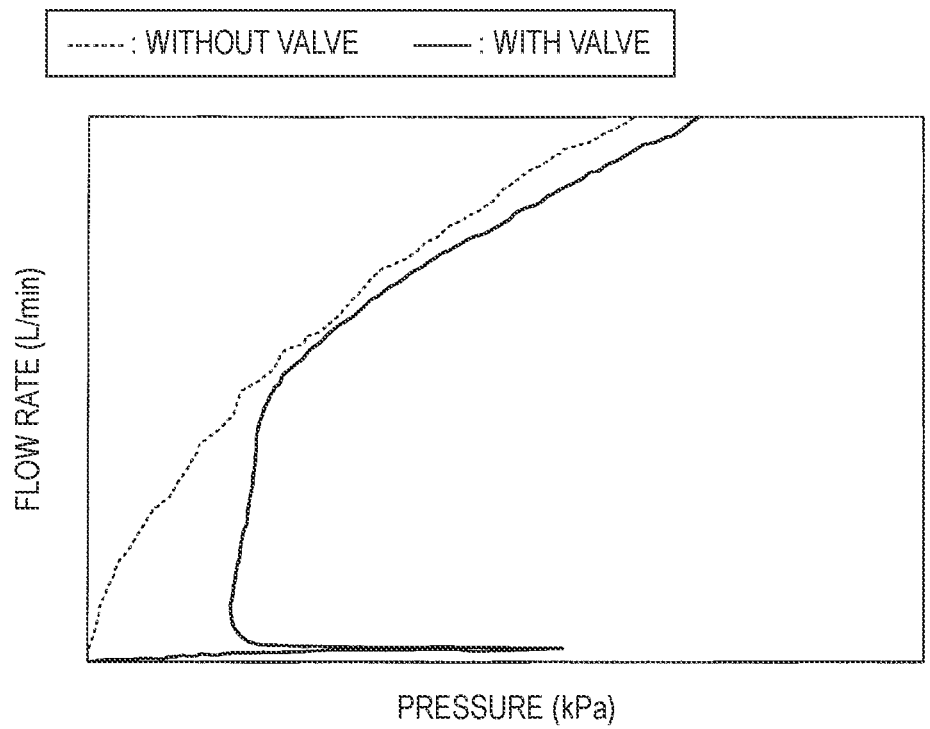
FIG. 16B is a graph showing the relationship between the pressure and the flow rate in a test result of Comparative Example 3.

As shown in FIG. 16B, in Comparative Example 3, as the flow rate increased, the pressure increased (see the peak on the lower right side of the graph) and then decreased, then rapidly increased, and gradually increased while drawing a curve similar to the broken line in the state where the valve was not provided, and the pressure adjusting valve was raised to the maximum (fully stroked). However, the solid line and the broken line on the upper side of the graph are relatively separated, and loss of pressure is large (the pressure loss is large). It is considered that this is because, when the pressure adjusting valve is raised to the maximum, the back surface thereof is positioned at the reduced diameter portion, so that the fluid is less likely to escape to the increased diameter portion side.

In contrast to Comparative Examples 1 to 3 described above, in Example shown in FIG. 13, as the flow rate increased, the pressure increased (see the peak on the lower right side of the graph) and then decreased, then rapidly increased, and gradually increased while drawing a curve similar to the broken line in the state where the valve was not provided, and the pressure adjusting valve was raised to the maximum (fully stroked). In addition, the solid line and the broken line on the upper side of the graph are close to each other, and loss of pressure is small (pressure loss is small). As described above, in the Example, it was found that the pressure adjusting valve can be reliably fully stroked, and the pressure loss is also small.

REFERENCE SIGNS LIST 1 fuel tank
10, 10A valve device
15 housing
20 housing main body
23 partition wall
25 valve hole
26 first valve seat
27 second valve seat
30, 30A accommodation portion
35 reduced diameter portion
36 upper end
37 increased diameter portion
39 stepped portion
60 cover
70 cap
80 float valve
90 pressure adjusting valve (adjusting valve)
91 back surface
92 front surface
95 urging spring
97 seal ring
R ventilation chamber
R1 accommodating space (internal space)
R2 outer space
R4 storage space
V valve chamber

The invention claimed is:

1. A valve device comprising:
a housing in which a valve chamber is provided on a lower side and a ventilation chamber is provided on an upper side via a partition wall, the valve chamber communicating with an inside of a fuel tank, the ventilation chamber communicating with an outside of the fuel tank, and the partition wall being formed with a valve hole through which the valve chamber and the ventilation chamber communicate with each other;
a float valve accommodated in the valve chamber so as to be movable up and down and configured to open and close the valve hole; and
a pressure adjusting valve configured to adjust pressure and accommodated in the ventilation chamber so as to be movable up and down,
wherein a first valve seat which the pressure adjusting valve is configured to come into contact with and separate from is formed from the valve hole toward the upper side, and a second valve seat which the float valve is configured to come into contact with and separate from is formed from the valve hole toward the lower side,
wherein an accommodation portion configured to surround and accommodate the pressure adjusting valve is provided in a protruding manner from a surface of the partition wall toward the upper side, and an internal space of the accommodation portion communicates with the valve hole,
wherein an inner periphery of the accommodation portion is provided with
a reduced diameter portion positioned on a side of the partition wall, the reduced diameter portion having a shape surrounding an outer periphery of the pressure adjusting valve, and
an increased diameter portion positioned above the reduced diameter portion in an axial direction, the increased diameter portion having a shape larger in diameter than the outer periphery of the pressure adjusting valve,
wherein a height of an upper end of the reduced diameter portion from the surface of the partition wall on the side of the ventilation chamber is equal to or greater than a position of a front surface of the pressure adjusting valve in the axial direction when a back surface of the pressure adjusting valve is in contact with the first valve seat, and
wherein the front surface of the pressure adjusting valve and the back surface of the pressure adjusting valve are each positioned above the height of the upper end of the reduced diameter portion in the axial direction when the pressure adjusting valve is raised to a maximum due to an increase in pressure in the fuel tank.

2. The valve device according to claim 1,
wherein a storage space configured to store fuel flowed into the ventilation chamber is formed between an outer periphery of the accommodation portion and an inner periphery of the housing, and
wherein an upper end of the accommodation portion is formed so as to be positioned below a fuel vapor discharge port provided in the housing and communicating with the outside of the fuel tank.

3. The valve device according to claim 1,
wherein the increased diameter portion is provided with a plurality of ribs extending in an axial direction of the increased diameter portion and arranged at predetermined intervals in a peripheral direction of the increased diameter portion.

4. The valve device according to claim 3,
wherein inner ends of the ribs in a radial direction are formed at the same position as an inner peripheral surface of the reduced diameter portion when the accommodation portion is viewed in the axial direction.

5. The valve device according to claim 1,
wherein a plurality of openings are formed at equal intervals in a peripheral direction of the accommodation portion.

6. A valve device comprising:
a housing in which a valve chamber is provided on a lower side and a ventilation chamber is provided on an upper side via a partition wall, the valve chamber communicating with an inside of a fuel tank, the ventilation chamber communicating with an outside of the fuel tank, and the partition wall being formed with a valve hole through which the valve chamber and the ventilation chamber communicate with each other;
a float valve accommodated in the valve chamber so as to be movable up and down and configured to open and close the valve hole; and
a pressure adjusting valve configured to adjust pressure and accommodated in the ventilation chamber so as to be movable up and down,
wherein a first valve seat which the pressure adjusting valve is configured to come into contact with and separate from is formed from the valve hole toward the upper side, and a second valve seat which the float valve is configured to come into contact with and separate from is formed from the valve hole toward the lower side,
wherein an accommodation portion configured to surround and accommodate the pressure adjusting valve is provided in a protruding manner from a surface of the partition wall toward the upper side, and an internal space of the accommodation portion communicates with the valve hole,
wherein an inner periphery of the accommodation portion is provided with a reduced diameter portion positioned on a side of the partition wall and having a shape adapted to an outer periphery of the pressure adjusting valve, and an increased diameter portion positioned above the reduced diameter portion and having a shape larger in diameter than the outer periphery of the pressure adjusting valve,
wherein a height of an upper end of the reduced diameter portion from the surface of the partition wall on the side of the ventilation chamber is equal to or greater than a front surface of the pressure adjusting valve in a state where the pressure adjusting valve is in contact with the first valve seat,
wherein the pressure adjusting valve is configured to be beyond the upper end of the reduced diameter portion when the pressure adjusting valve is raised to a maximum due to an increase in pressure in the fuel tank,
wherein the increased diameter portion is provided from the upper end of the reduced diameter portion via a stepped portion,
wherein the increased diameter portion is provided with a plurality of ribs extending from the stepped portion in an axial direction of the increased diameter portion and arranged at predetermined intervals in a peripheral direction of the increased diameter portion, and wherein inner ends of the ribs in a radial direction are formed at the same position as an inner peripheral surface of the reduced diameter portion when the accommodation portion is viewed in the axial direction.

* * * * *